(12) United States Patent
Chow et al.

(10) Patent No.: US 7,506,177 B2
(45) Date of Patent: Mar. 17, 2009

(54) TAMPER RESISTANT SOFTWARE ENCODING AND ANALYSIS

(75) Inventors: Stanley T. Chow, Nepean (CA); Harold J. Johnson, Nepean (CA); Alexander Shokurov, Moscow (RU)

(73) Assignee: Cloakware Corporation, Ottawa, Ontario (CA)

( * ) Notice: Subject to any disclaimer, the term of this patent is extended or adjusted under 35 U.S.C. 154(b) by 486 days.

(21) Appl. No.: 10/478,678

(22) PCT Filed: May 24, 2002

(86) PCT No.: PCT/CA02/00754

§ 371 (c)(1),
(2), (4) Date: Jun. 7, 2004

(87) PCT Pub. No.: WO02/095546

PCT Pub. Date: Nov. 28, 2002

(65) Prior Publication Data

US 2004/0236955 A1  Nov. 25, 2004

(30) Foreign Application Priority Data

May 24, 2001  (CA) .................................. 2348355

(51) Int. Cl.
*G06F 11/30* (2006.01)
*G06F 12/14* (2006.01)
*H04L 9/32* (2006.01)

(52) U.S. Cl. ........................ 713/194; 713/189

(58) Field of Classification Search .................. 713/194
See application file for complete search history.

(56) References Cited

U.S. PATENT DOCUMENTS

| 6,598,166 | B1 * | 7/2003 | Folmsbee ..................... 713/190 |
| 6,668,325 | B1 * | 12/2003 | Collberg et al. ............. 713/194 |
| 6,829,710 | B1 * | 12/2004 | Venkatesan et al. ......... 713/176 |
| 7,054,443 | B1 * | 5/2006 | Jakubowski et al. .......... 380/28 |

OTHER PUBLICATIONS

Douglas Low, "Protecting Java Code Via Code Obfuscation," ACM Press, Crossroads vol. 4 Issue 3 pp. 21-23 (Spring 1998).*
Masahiro, Mambo, Takanori, Murayama, Eiji Okamoto, "A Tentative Approach To Constructing Tamper-Resistant Software," ACM Press, New Security Paradigms Workshop Preceeding of the 1997 workshop on new security paradigms pp. 23-33, 1998. ISBN: 0-89791-986-6.*

(Continued)

*Primary Examiner*—Carl Colin
*Assistant Examiner*—Oscar A Louie
(74) *Attorney, Agent, or Firm*—Dennis R. Haszko

(57) ABSTRACT

The present invention relates generally to computer software, and more specifically, to a method and system of making computer software resistant to tampering and reverse-engineering. Tampering refers to changing computer software in a manner that is against the wishes of the original author, and is distinct from obscurity techniques which do not change the underlieing data or control flow of a program. Broadly speaking, the method of the invention is to analyse the effectiveness of various encoding techniques by measuring the number of possible decodings corresponding to a given encoded world. This analysis gave rise to a number of new data flow encoding techniques including alternative mixed encoding (a combination of linear and residue number encoding), and multinomial encoding.

12 Claims, 7 Drawing Sheets

OTHER PUBLICATIONS

Christian Collberg, Clark Thomborson, Douglas Low, "Manufacturing Cheap, Resilient, And Stealthy Opaque Constructs," ACM Press, Annual Symposium on Principles of Programming Languages, Preceedings of the 25th ACM SIGPLAN-SIGACT symposium on Principles of programming languages, pp. 184-196, 1998. ISBN: 0-89791-979-3.*

Collberg et al., "Manufacturing Cheap, Resilient, and Healthy Opaque Constructs", Conference on Principles of Programming Languages (POPL), 1998, pp. 184-196.

Low, Protecting Java Code Via Code Obfuscation, Crossroads, vol. 4, Issue 3, 1998.

Mambo et al., "A Tentative Approach to Constructing Tamper-Resistant Software", New Security Paradigms Workshop, 1998.

Collberg et al., "Breaking Abstractions and Unstructing Data Structures", IEEE International Conference on Computer Languages, 1998.

Ahituv et al., "Processing Encrypted Data", Communications of the ACM, vol. 30, No. 9, Sep. 1987, pp. 777-780.

US 5,748,741, 05/1998, Johnson et al. (withdrawn)

* cited by examiner ent entry of International
TAMPER RESISTANT SOFTWARE ENCODING AND ANALYSIS

CROSS REFERENCE TO RELATED APPLICATION

This application is a National Stage entry of International Application No. PCT/CA02/00754, filed May 24, 2002, the entire specification claims and drawings of which are incorporated herewith by reference.

The present invention relates generally to computer software, and more specifically, to a method and system of making computer software resistant to tampering and reverse-engineering.

BACKGROUND OF THE INVENTION

The market for computer software in all of its various forms is recognized to be very large and is growing everyday. In industrialized nations, hardly a business exists that does not rely on computers and software either directly or indirectly, in their daily operations. As well, with the expansion of powerful communication networks such as the Internet, the ease with which computer software may be exchanged, copied and distributed is also growing daily.

With this growth of computing power and communication networks, a user's ability to obtain and run unauthorized or unlicensed software is becoming less and less difficult, and a practical means of protecting such computer software has yet to be devised.

Computer software is generally written by software developers in a high-level language which must be compiled into low-level object code in order to execute on a computer or other processor.

High-level computer languages use command wording that closely mirrors plain language, so they can be easily read by one skilled in the art. Object-code generally refers to machine-executable code, which is the output of a software compiler that translates source code from human-readable to machine-executable code.

The low-level structure of object code refers to the actual details of how the program works. Low-level analysis usually focuses on, or at least begins with, one routine at a time. This routine may be, for example, a procedure, function or method. Analysis of individual routines may be followed by analyses of wider scope in some compilation tool sets.

The low-level structure of a software program is usually described in terms of its data flow and control flow. Data-flow is a description of the variables together with the operations performed on them. Control-flow is a description of how control jumps from place to place in the program during execution, and the tests that are performed to determine those jumps.

Tampering refers to changing computer software in a manner that is against the wishes of the original author. Traditionally, computer software programs have had limitations encoded into them, such as requiring password access, preventing copying, or allowing the software only to execute a predetermined number of times or for a certain duration. However, because the user has complete access to the software code, methods have been found to identify the code administering these limitations. Once this coding has been identified, the user is able to overcome these programmed limitations by modifying the software code.

Since a piece of computer software is simply a listing of data bits, ultimately, one cannot prevent attackers from making copies and making arbitrary changes. As well, there is no way to prevent users from monitoring the computer software as it executes. This allows the user to obtain the complete data-flow and control-flow, so it was traditionally thought that the user could identify and undo any protection. This theory seemed to be supported in practice. This was the essence of the copy-protection against hacking war that was common on Apple-II and early PC software, and has resulted in these copy-protection efforts being generally abandoned.

Since then, a number of attempts have been made to prevent attacks by "obfuscating" or making the organisation of the software code more confusing and hence, more difficult to modify. Software is commercially available to "obfuscate" source in code in manners such as:

globally replacing variable names with random character strings. For example, each occurrence of the variable name "SecurityCode" could be replaced with the character string "1xcd385mxc" so that it is more difficult for an attacker to identify the variables he is looking for;
  deleting comments and other documentation; and
  removing source-level structural indentations, such as the indentation of loop bodies, to make the loops more difficult to read.

While these techniques obscure the source code, they do not make any attempts to deter modification. These methods produce superficial changes, but the information exposed by deeper analyses employed by optimizing compilers and similar sophisticated tools is changed very little. The data flow and control flow information exposed by such analyses is either not affected at all, or is only slightly affected, by the above methods of obfuscation. Once the attacker has figured out how the code operates, he is free to modify it as he choses.

A more complex approach to obfuscation is presented in issued U.S. Pat. No. 5,748,741 which describes a method of obfuscating computer software by artificially constructing a "complex wall". This "complex wall" is preferably a "cascade" structure, where each output is dependent on all inputs. The original program is protected by merging it with this cascade, intertwining the two. The intention is to make it very difficult for the attacker to separate the original program from the complex wall again, which is necessary to alter the original program. This system suffers from several major problems:

large code expansion, exceeding a hundred fold, required to create a sufficiently elaborate complex wall, and to accommodate its intertwining with the original code; and
  low security since the obfuscated program may be divided into manageable blocks which may be de-coded individually, allowing the protection to be removed one operation at a time.

Other researchers are beginning to explore the potential for obfuscation in ways far more effective than what is achieved by current commercial code obfuscators, though still inferior to the obfuscation of issued U.S. Pat. No. 5,748,741. For example, in their paper "*Manufacturing cheap, resilient, and stealthy opaque constructs*", Conference on Principles of Programming Languages (POPL), 1998 [ACM 0-89791-979-3/98/01], pp. 184-196, C. Collburg, C. Thomborson, and D. Low propose a number of ways of obscuring a computer program. In particular, Collburg et al. disclose obscuring the decision process in the program, that is, obscuring those computations on which binary or multiway conditional branches determine their branch targets. Clearly, there are major deficiencies to this approach, including:

because only control-flow is being addressed, domain transforms are not used and data obfuscation is weak; and there is no effort to provide tamper-resistance. In fact, Collburg et al. do not appear to recognize the distinction between tamper-resistance and obfuscation, and as a result, do not provide any tamper-proofing at all.

The approach of Collburg et al. is based on the premise that obfuscation can not offer a complete solution to tamper protection. Collburg et al. state that: ". . . code obfuscation can never completely protect an application from malicious reverse-engineering efforts. Given enough time and determination, Bob will always be able to dissect Alice's application to retrieve its important algorithms and data structures."

A software approach for computing with encrypted data is described by Niv Ahituv, Yeheskel Lapid, and Seev Neumann, in *Processing encrypted data*, Communications of the ACM 30(9), September 1987, pp. 777-780. This method hides the actual value of the data from the software doing the computation. However, the computations which are practical using this technique are quite restricted.

In *Breaking abstractions and unstructuring data structures*, IEEE International Conference on Computer Languages, 1998, Christian Collberg, Clark Thomborson, and Douglas Low provide more comprehensive proposals on obfuscation, together with methods for obfuscation of structured and object-oriented data.

There remains a weakness, however, in the methods proposed by Ahituv et al. and Collberg et al. Obfuscation and tamper-resistance are distinct problems, and while weak obfuscation is provided by Ahituv et al. and Collberg et al., they do not address tamper resistance at all. For example, consider removing password protection from an application by changing the password decision branch from a conditional one to an unconditional one. Plainly, this vulnerability cannot be eliminated effectively by any amount of mere obfuscation. A patient attacker tracing the code will eventually find the "pass, friend"/"begone, foe" branch instruction. Identifying this branch instruction allows the attacker to circumvent a protection routine by simply re-coding it to a non-conditional branch. Therefore, other methods are required to avoid such single points of failure.

The level of obfuscation obtained using the above techniques is plainly quite weak, since the executed code, control flow and data flow analysed in graph form, is either isomorphic to, or nearly isomorphic to, the unprotected code. That is, although the details of the obfuscated code are different from the original code, the general organisation and structure have not changed.

As noted above, it is desirable to prevent users from making small, meaningful changes to computer programs, such as overriding copy protection and timeouts in demonstration software. It is also necessary to protect computer software against reverse engineering which might be used to identify valuable intellectual property contained within a software algorithm or model. In hardware design, for example, vendors of application specific integrated circuit (ASIC) cell libraries often provide precise software models corresponding to the hardware, so that users can perform accurate system simulations. Because such a disclosure usually provides sufficient detail to reveal the actual cell design, it is desirable to protect the content of the software model.

In other applications, such as emerging encryption and electronic signature technologies, there is a need to hide secret keys in software programs and transmissions, so that software programs can sign, encrypt and decrypt transactions and other software modules. At the same time, these secret keys must be protected against being leaked.

There is therefore a need for a method and system of making computer software resistant to tampering and reverse engineering. This design must be provided with consideration for the necessary processing power and real time delay to execute the protected software code, and the memory required to store it.

SUMMARY OF THE INVENTION

It is therefore an object of the invention to provide a method and system of making computer software resistant to tampering and reverse engineering which addresses the problems outlined above.

The method and system of the invention recognizes that attackers cannot be prevented from making copies and making arbitrary changes. However, the most significant problem is "useful tampering" which refers to making small changes in behaviour. For example, if the trial software was designed to stop working after ten invocations, tampering that changes the "ten" to "hundred" is a concern, but tampering that crashes the program totally is not a priority since the attacker gains no benefit.

Data-flow describes the variables together with operations performed on them. The invention increases the complexity of the data-flow by orders of magnitude, allowing "secrets" to be hidden in the program, or the algorithm itself to be hidden. "Obscuring" the software coding in the fashion of known code obfuscators is not the primary focus of the invention. Obscurity is necessary, but not sufficient for, achieving the prime objective of the invention, which is tamper-proofing.

One aspect of the invention is broadly defined as a method of increasing the tamper-resistance and obscurity of computer software code comprising the steps of: proposing a set of possible encoding techniques; calculating the number of possible solutions that would correspond to each of said set of possible encoding techniques; and encoding said target program using the encoding technique that results in the greatest number of possible solutions.

The Applicant has several pending patent applications describing various techniques for converting computer software into tamper-resistant form. While it is understood that these techniques could be applied in combination with one another, the synergy that certain combinations would offer was not clear until the analysis technique of the invention was conceived and applied.

Once these combinations were investigated further, it was also found that certain improvements could be made to their implementations, which went beyond the initial teachings.

One exceptionally effective technique is broadly defined as a combination of linear and residue number encoding (described herein as "alternative mixed encoding"). Another exceptionally effective technique is described as multinomial encoding.

BRIEF DESCRIPTION OF THE DRAWINGS

These and other features of the invention will become more apparent from the following description in which reference is made to the appended drawings in which.

DETAILED DESCRIPTION OF PREFERRED EMBODIMENTS OF THE INVENTION

The invention lies in a means for recoding software code in such a manner that it is fragile to tampering. Attempts to modify the software code will therefore cause it to become inoperable in terms of its original function. The tamper-resistant software may continue to run after tampering, but no longer performs sensible computation.

The extreme fragility embedded into the program by means of the invention does not cause execution to cease immediately, once it is subjected to tampering. It is desirable for the program to continue running so that, by the time the attacker realizes something is wrong, the modifications and events which caused the functionality to become nonsensical are far in the past. This makes it very difficult for the attacker to identify and remove the changes that caused the failure to occur.

Figure 1:
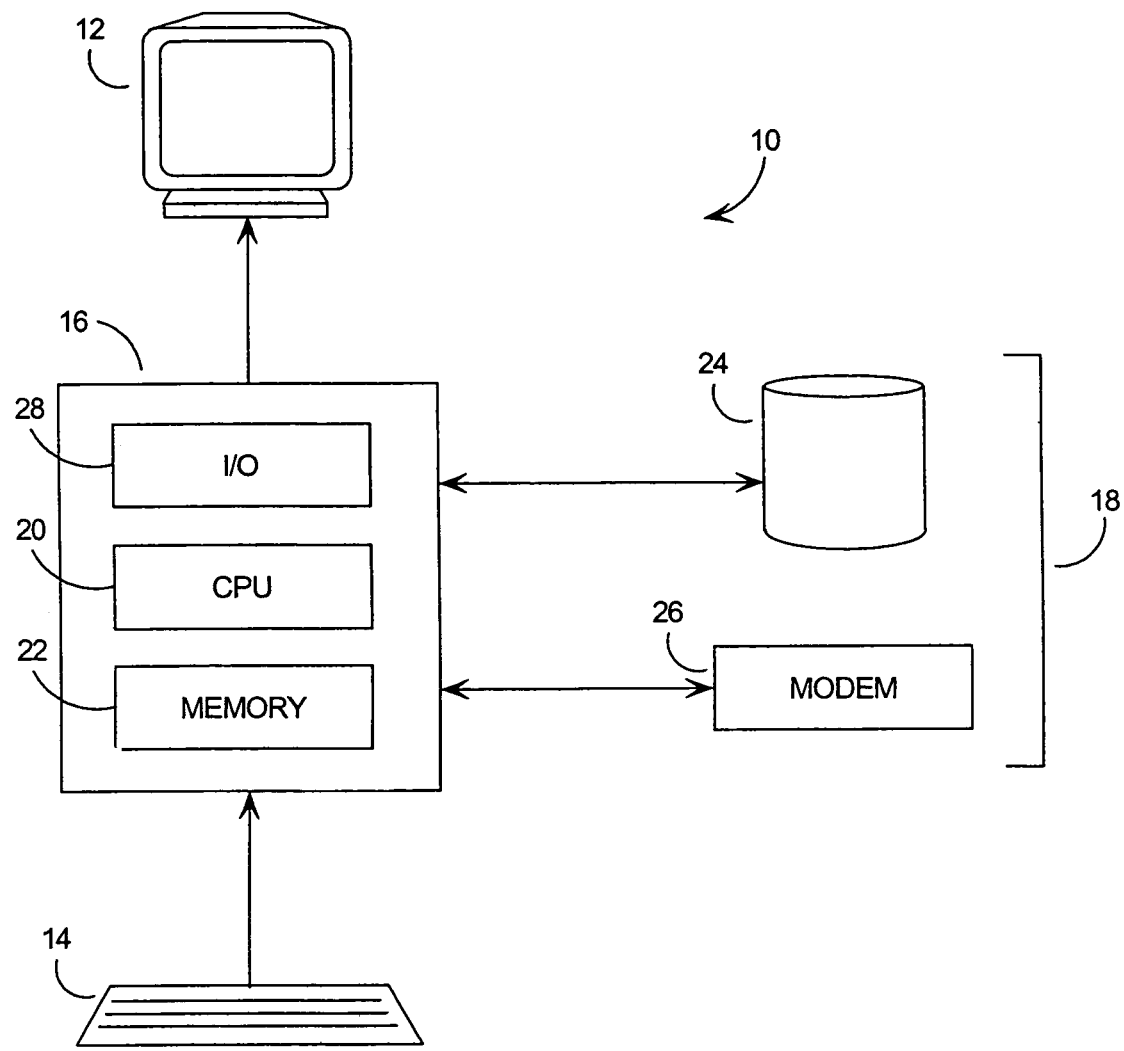
FIG. 1 presents an exemplary computer system in which the invention may be embodied.

As a matter of background, an exemplary system on which the invention can be implemented, will first be presented with respect to FIG. 1. Next, several techniques which are presented in co-pending patent applications will then be described with respect to FIGS. 2 through 4. These techniques, particularly linear encoding and residue number encoding, form the foundation for the new techniques of the invention.

Figure 2:
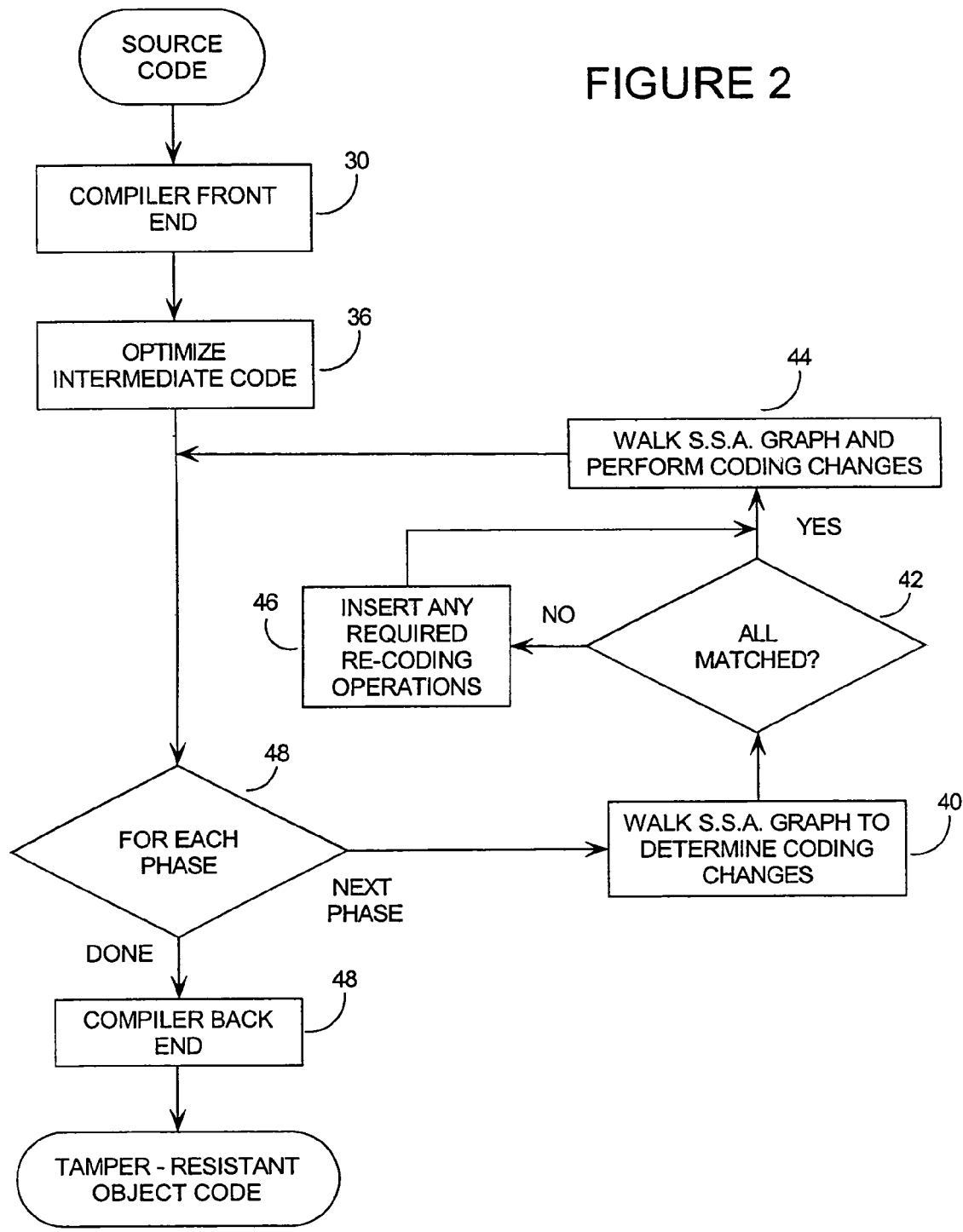
FIG. 2 presents a flow chart of a general algorithm for implementation of the invention.

An example of a system upon which the invention may be performed is presented as a block diagram in FIG. 2. This computer system 10 includes a display 12, keyboard 14, computer 16 and external devices 18.

The computer 16 may contain one or more processors or microprocessors, such as a central processing unit (CPU) 20. The CPU 20 performs arithmetic calculations and control functions to execute software stored in an internal memory 22, preferably random access memory (RAM) and/or read only memory (ROM), and possibly additional memory 24. The additional memory 24 may include, for example, mass memory storage, hard disk drives, floppy disk drives, magnetic tape drives, compact disk drives, program cartridges and cartridge interfaces such as those found in video game devices, removable memory chips such as EPROM or PROM, or similar storage media as known in the art. This additional memory 24 may be physically internal to the computer 16, or external as shown in FIG. 1.

The computer system 10 may also include other similar means for allowing computer programs or other instructions to be loaded. Such means can include, for example, a communications interface 26 which allows software and data to be transferred between the computer system 10 and external systems. Examples of communications interface 26 can include a modem, a network interface such as an Ethernet card, a serial or parallel communications port. Software and data transferred via communications interface 26 are in the form of signals which can be electronic, electromagnetic, optical or other signals capable of being received by communications interface 26. Multiple interfaces, of course, can be provided on a single computer system 10.

Input and output to and from the computer 16 is administered by the input/output (I/O) interface 28. This I/O interface 28 administers control of the display 12, keyboard 14, external devices 18 and other such components of the computer system 10.

The invention is described in these terms for convenience purposes only. It would be clear to one skilled in the art that the invention may be applied to other computer or control systems 10. Such systems would include all manner of appliances having computer or processor control including telephones, cellular telephones, televisions, television set top units, point of sale computers, automatic banking machines, lap top computers, servers, personal digital assistants and automobiles.

Compiler Technology

In the preferred embodiment, the invention is implemented in terms of an intermediate compiler program running on a computer system 10. Standard compiler techniques are well known in the art, and will not be reviewed in detail herein. Two standard references which may provide necessary background are "Compilers Principles, Techniques, and Tools" 1988 by Alfred Aho, Ravi Sethi and Jeffrey Ullman (ISBN 0-201-1008-6), and "Advanced Compiler Design & Implementation" 1997 by Steven Muchnick (ISBN 1-55860-320-4). The preferred embodiment of the invention is described with respect to static single assignment, which is described in Muchnick.

Generally, a software compiler is divided into three components, described as the front end, the middle, and the back end. The front end is responsible for language dependent analysis, while the back end handles the machine-dependent parts of code generation. Optionally, a middle component may be included to perform optimizations that are independent of language and machine. Typically, each compiler family will have only one middle, with a front end for each high-level language and a back end for each machine-level language.

All of the components in a compiler family can generally communicate in a common intermediate language so they are easily interchangeable. This intermediate language is generally in a form which exposes both control- and data-flow so that they are easily manipulated. Such an intermediate form may be referred to as flow-exposed form.

In the preferred embodiment of the invention, it is the intermediate code that will be manipulated to make the desired areas of the input software tamper-resistant.

The invention can most easily be applied to software code in Static Single Assignment (SSA) form. SSA is a well-known, popular and efficient flow-exposed formused by software compilers as a code representation for performing analyses and optimizations involving scalar variables. Effective algorithms based on SSA have been developed to address constant propagation, redundant computation detection, dead code elimination, induction variable elimination, and other requirements.

Of course, the method of the invention could be applied to flow-exposed forms other than SSA, where these provide similar levels of semantic information, as in that provided in Gnu CC. Gnu CC software is currently available at no cost from the Free Software Foundation.

Similarly, the method of the invention could be applied to software in its high level or low level forms, if such forms were augmented With the requisite control- and data-flow information. This flexibility will become clear from the description of the encoding techniques described hereinafter.

General Implementation of Tamper-Resistant Compiling

In general, the tamper-resistant encoding techniques of the invention may be implemented as shown in FIG. 2.

To begin with, high level code can be converted to intermediate form at step 30, using an appropriate compiler front end. Any desirable code optimization should then be performed at step 32. Code optimization would generally be ineffective if implemented after the tamper-resistant encoding, as the tamper-resistant encoding is deliberately designed to frustrate simplification and organization.

The tamper-resistant encoding is now performed in three passes of the intermediate code graph for each phase of encoding, shown in FIG. 2 as steps 38 through 46. In the preferred embodiment of the invention, the popular practice of dividing the compiler into a number of phases, several dozen, in fact, is being followed. Each phase reads the SSA graph and does only a little bit of the encoding, leaving a slightly updated static single assignment graph. This makes it easier to understand and to debug. A "phase control file" may be used to specify the ordering of the phases at step 38 and particular parameters of each phase, for added flexibility in ordering phases. This is particularly useful when one phase is to be tested by inserting auditing phases before and/or after it, or when debugging options are added to various phases to aid debugging.

Whenever variable codings are chosen, three passes of the intermediate code graph are generally required. In a first pass, at step 40, the tamper-resistant encoding compiler 34 walks the SSA graph and develops a proposed system of re-codings. If the proposed codings are determined to be acceptable at step 42, which may require a second pass of the SSA graph, control proceeds to step 44, where the acceptable re-codings are then made in a third pass. If the proposed coding is found to contain mismatches at step 42, then recodings are inserted as needed to eliminate the mismatches at step 46.

Once all of the encoding phases have been executed, the resulting tamper-resistant intermediate code is then compiled into object code for storage or machine execution by the compiler back end 48.

The tamper-resistant techniques described hereinafter, would generally be implemented at step 40 of such a routine.

Before considering the new analysis and tamper-resistant encoding techniques, the polynomial (or linear) and residue number techniques described in earlier patent applications should be reviewed.

Polynomial Coding

The polynomial encoding technique takes an existing set of equations and produces an entirely new set of equations with different variables. The variables in the original program are usually chosen to have meaning in the real world while, the new encoded variables will have no such meaning. As well, the clever selection of constants and polynomials used to define the new set of equations may allow the original mathematical operations to be hidden.

This technique represents a variable x by some polynomial of x, such as ax+b where a and b are some random numbers. This technique allows us to hide operations by changing their sense, or to distribute the definition of a variable around in a program.

A convenient way to describe the execution of the polynomial routine is in terms of a "phantom parallel program". As the polynomial encoding routine executes and encodes the original software program, there is a conceptual program running in parallel, which keeps track of the encodings and their interpretations. After the original software program has been encoded, this "phantom parallel program" adds lines of code which "decode" the output back to the original domain.

For example, if the SSA graph defines the addition of two variables as:

$$z := x - y \quad (1)$$

this equation may be hidden by defining new variables:

$$x' := ax + b \quad (2)$$

$$y' := cy + d \quad (3)$$

$$z' := ez + f \quad (4)$$

Next, a set of random values for constants a, b, c, d, e, and f is chosen, and the original equation (1) in the software program is replaced with the new equation (5). Note that, in this case, the constant c is chosen to be equal to −a, which hides the subtraction operation from equation (1) by replacing it with an addition operation:

$$z' := x' + y' \quad (5)$$

The change in the operation can be identified by algebraic substitution:

$$z' := a(x-y) + (b+d) \quad (6)$$

Equation (5) is the equation that will replace equation (1) in the software program, but the new equations (2), (3) and (4) will also have to be propagated throughout the software program. If any conflicts arise due to mismatches, RECODE operations will have to be inserted to eliminate them.

In generating the tamper-resistant software, the transformations of each variable are recorded so that all the necessary relationships can be coordinated in the program as the SSA graph is traversed. However, once all nodes of the SSA graph have been transformed and the "decoding" lines of code added at the end, the transformation data may be discarded, including equations (3), (4) and (5). That is, the "phantom parallel program" is discarded, so there are no data left which an attacker may use to reverse engineer the original equations.

Note that a subtraction has been performed by doing an addition without leaving a negative operator in the encoded program. The encoded program only has a subtraction operation because the phantom program knows "c=−a". If the value of the constant had been assigned as "c=a", then the encoded equation would really be an addition. Also, note that each of the three variables used a different coding and there was no explicit conversion into or out of any encoding.

For the case of:

$$y := -x \quad (7)$$

one could chose:

$$x' := ax + b, \text{ and} \quad (8)$$

$$y' := (-a)y + b \quad (9)$$

which would cause the negation operation to vanish, and x and y to appear to be the same variable. The difference is only tracked in the interpretation.

Similarly, for the case of:

$$y := x + 5 \quad (10)$$

one could chose:

$$y' := ax + (b+5) \quad (11)$$

causing the addition operation to vanish. Again, now there are two different interpretations of the same value.

Figure 3:
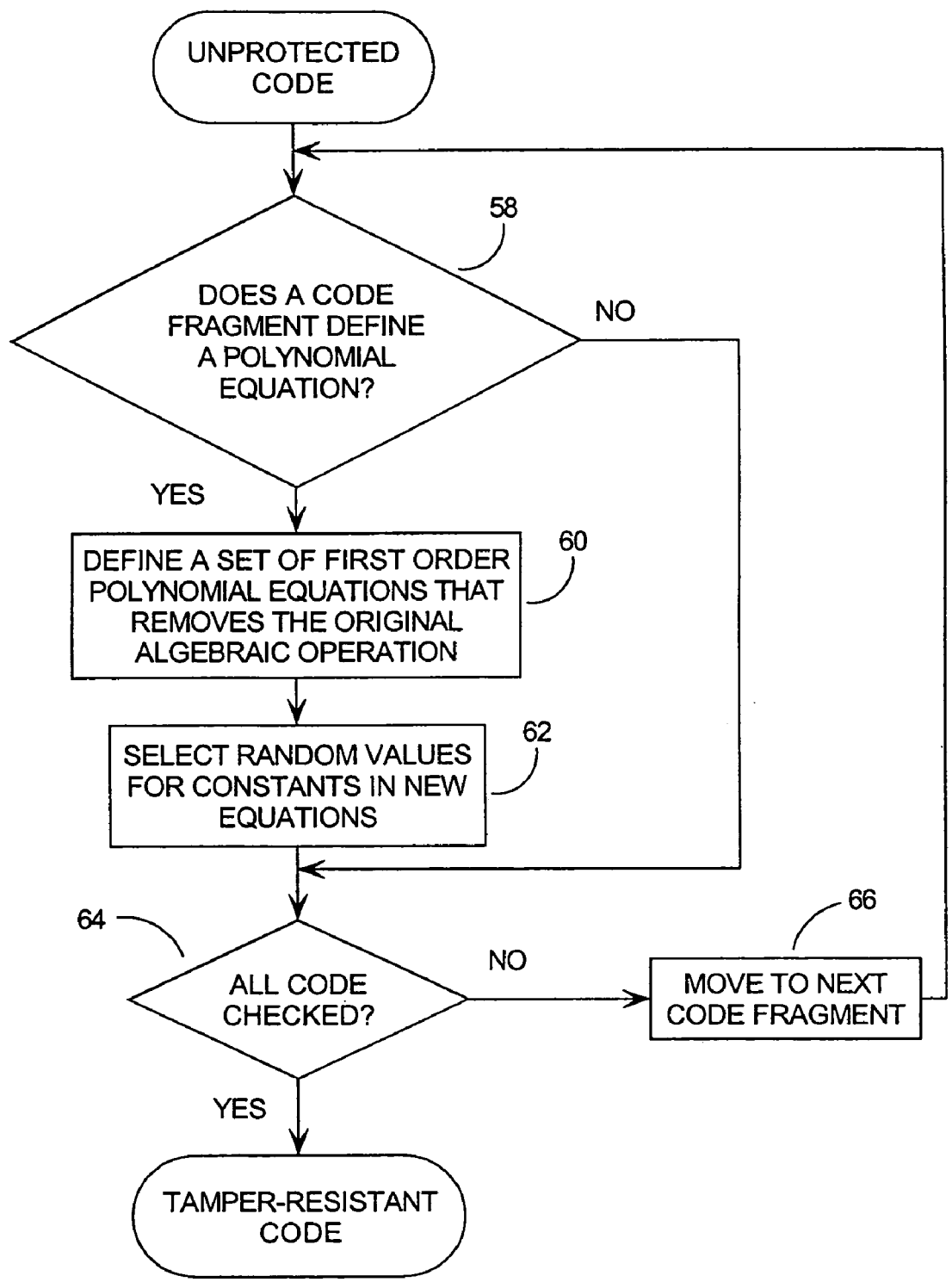
FIG. 3 presents a flow chart of a polynomial encoding routine in an embodiment of the invention.

FIG. 3 presents a simple implementation of the polynomial coding technique. At step 58, a fragment of code from the SSA graph is analysed to determine whether it defines a polynomial equation suitable for polynomial encoding. If so, a suitable set of polynomial equations is defined at step 60 that accomplishes the desired encoding. As noted above, this technique is generally applied to physically distribute the definition of a variable throughout a program so a single assignment is usually replaced by a system of assignments distributed throughout the program.

For the simple polynomial scheme, the values of constants are generally unrestricted and the only concern is for the size of the numbers. Values are chosen which do not cause the coded program to overflow. In such a case, the values of constants in these equations may be selected randomly at step 62, within the allowable constraints of the program. However, as noted above, judicious selection of values for constants may be performed to accomplish certain tasks, such as inverting arithmetic operations.

At the decision block of step 64 it is then determined whether the entire SSA graph has been traversed, and if not, the compiler steps incrementally to the next code fragment by means of step 66. Otherwise, the phase is complete.

Variations on this technique would be clear to one skilled in the art. For example, higher order polynomials could be used, or particular transforms developed to perform the desired hiding or inversion of certain functions.

Residue Number Coding

This technique makes use of the "Chinese Remainder Theorem" and is usually referred to as "Residue Numbers" in text books (see "The Art of Computer Programming", volume 2: "Seminumerical Algorithms", 1997, by Donald E. Knuth, ISBN 0-201-89684-2, pp. 284-294, or see "Introduction to Algorithms", 1990, by Thomas H. Cormen, Charles E. Leiserson, and Ronald L. Rivest, ISBN 0-262-03141-8, pp. 823-826). A "base" is chosen, consisting of a vector of pairwise relatively prime numbers, for example: 3, 5 and 7. Then, each variable x is represented as a vector of remainders when this variable is operated upon by the "base", that is, x maps on to (x rem 3, x rem 5, x rem 7).

In this scheme, a "Modular Base" consists of several numbers that are pairwise relatively prime. Two distinct integers are said to be relatively prime if their only common divisor is 1. A set of integers are said to be pairwise relatively prime, if for each possible distinct pair of integers from the set, the two integers of the pair are relatively prime.

An example of such a set would be {3, 5, 7}. In this base, integers can be represented as a vector of remainders by dividing by the base. For example:

0=(0, 0, 0),
 1=(1, 1, 1),
 5=(2, 0, 5),
 100=(1, 0, 2), and
 105=(0, 0, 0).

Note that this particular base {3, 5, 7} has a period of 105, which is equal to the product of 3×5×7, so that only integers inside this range may be represented. The starting point of the range may be chosen to be any value. The most useful choices in this particular example would be [0, 104] or [−52, 52].

If two integers are represented in the same base, simple arithmetic operations may be performed very easily. Addition, subtraction and multiplication for example, may be performed component wise in modular arithmetic. Again, using the base of {3, 5, 7}:

if:
$$1 = (1, 1, 1) \qquad \text{and}$$
$$5 = (2, 0, 5), \qquad \text{then}$$
$$1 + 5 = ((1 + 2) \bmod 3, (1 + 0) \bmod 5, (1 + 5) \bmod 7)$$
$$= (0, 1, 6)$$

Of course, 1+5=6, and 6 in residue form with the same base is (0, 1, 6). Subtracton and multiplication are performed in a corresponding manner.

Heretofore, division had been thought to be impossible, but can be done advantageously in a manner of the invention. First, however, it is of assistance to review the method of solving for the residue numbers.

Converting from an integer to a corresponding Residue Number is simply a matter of dividing by each number in the base set to determine the remainders. However, converting from a Residue Number back to the original integer is more difficult. The solution as presented by Knuth is as follows. Knuth also discusses and derives the general solution, which will not be presented here:

For an integer "a" which may be represented by a vector of residue numbers $(a_1, a_2, \ldots a_k)$:

$$a = (a_1 c_1 + a_2 c_2 + \ldots + a_k c_k)(\bmod n) \qquad (12)$$

where:
$$a_i = a(\bmod n_i) \quad \text{for } i = 1, 2, \ldots, k$$

and:
$$n = n_1 \times n_2 \times \ldots \times n_k$$

and:
$$c_i = m_i(m_i^{-1} \bmod n_i) \quad \text{for } i = 1, 2, \ldots, k \qquad (13)$$

and:
$$m_i = n/n_i \quad \text{for } i = 1, 2, \ldots, k \qquad (14)$$

and where the notation "$(x^{-1} \bmod y)$" used above denotes that integer z such that xz (mod y)=1. For example, $(3^{-1} \bmod 7)$=5 because 15 (mod 7)=1, where 15=3×5.

In the case of this example, with a base (3, 5, 7), a vector of solution constants, (c3=70, c5=21, c7=15), are calculated. Once these constants have been calculated, converting a residue number (1, 1, 1) back to the original integer is simply a matter of calculating:

$$r_1 c_1 + r_2 c_2 + r_3 c_3 = 1 \times 70 + 1 \times 21 + 1 \times 15 \qquad (15)$$
$$= 106$$

assuming a range of [0, 104], multiples of 105 are subtracted yielding an integer value of 1.

Most texts like Knuth discuss Residue Numbers in the context of hardware implementation or high-precision integer arithmetic, so their focus is on how to pick a convenient base and how to convert into and out of that base. However, in applying this technique to the invention, the concern is on how to easily create many diverse bases.

In choosing a basis for Residue Numbers, quite a few magic coefficients may be generated dependent on the bases. By observation of the algebra, it is desirable to have different bases with a large number of common factors. This can be easily achieved by having a list of numbers which are pairwise relatively prime, and each base just partitions these numbers into the components. For example, consider the set {16, 9, 5, 7, 11, 13, 17, 19, 23}, comprising nine small positive integers which are either prime numbers or powers of prime numbers. One can obtain bases for residual encoding by taking any three distinct elements of this set. This keeps the numbers roughly the same size and allows a total range of 5,354,228,880 which is sufficient for 32 bits. For example, one such base generated in this manner might be {16*9*11, 5*13*23, 7*17*19}={1584, 1495, 2261}.

The invention allows a system of many bases with hidden conversion between those bases. As well, it allows the solution constants to be exposed without exposing the bases themselves. The original bases used to convert the software to residue numbers are not required to run the software, but would be required to decode the software back to the original high level source code. The invention allows a set of solution constants to be created which may run the software, without exposing the original bases. Therefore, the solution constants are of no assistance to the attacker in decoding the original software, or reverse engineering it.

To hide the conversion of a residue number, r, defined by a vector of remainders $(r_1, r_2, \ldots r_n)$ derived using a base of pairwise relatively prime numbers $(b_1, b_2, \ldots b_n)$, a vector of solution constants are derived as follows. Firstly, using the method of Knuth, a vector of constants $(c_1, c_2, \ldots c_k)$ may be determined which provides the original integer by the calculation:

$$r = (r_1 c_1 + r_2 c_2 + \ldots + r_k c_k)(\bmod b_i) \qquad (16)$$

where $b_i$ is the ith number in the vector of pairwise relatively prime numbers $\{b_1, b_2, \ldots b_n\}$. As each of the corresponding $r_1, r_2, \ldots r_n$ are residues, they will all be smaller than $b_i$, therefore equation (16) may be simplified to:

$$r_i = (c_1 \bmod b_i) \times r_1 + (c_2 \bmod b_i) \times r_2 + \ldots + (c_k \bmod b_i) \times r_n \qquad (17)$$

Each component ($c_i \bmod b_j$) will be a constant for a given basis, and can be pre-calculated and stored so that the residue numbers can be decoded, and the software executed, when required. Because the vector of ($c_i \bmod b_j$) factors are not relatively prime, they will have common factors. Therefore, the base $\{b_1, b_2, \ldots b_n\}$ can not be solved from knowledge of this set of factors. Therefore, storing this set of solution constants with the encoded software does not provide the attacker with any information about the old or the new bases.

Division of Residue Numbers

Most texts like Knuth also indicate that division is impossible. However, the invention provides a manner of division by a constant.

In order to perform division by a constant using residue numbers, the divisor must be one of the numbers of the base:

Let: the base be $\{b_1, b_2, \ldots b_n\}$,
the divisor be $b_i$, which is a member of the set $\{b_1, b_2, \ldots b_n\}$, and
the quotient be $\{q_1, q_2, \ldots, q_n\}$.

Then, to calculate $q_j$ (where i is not j):

$$q_j = (c_j/b_i \bmod b_j) * r_j + (c_i - 1)/b_i \bmod b_i * r_i \qquad (19)$$

The algebraic derivation is straightforward, by symbolically performing the full decoding and division. The key is the observation that all the other terms vanish due to the construction of the $c_i$'s.

To calculate $q_i$, the terms do not vanish, so a computation must be made of:

$$q_i = (c_1/b_i \bmod b_i)*r_1 + \ldots + (c_n/b_i \bmod b_i)*r_n \qquad (20)$$

This equation does not take account of the range reduction needed, so a separate computation is used to calculate the number of times the range has been wrapped around, so that the proper value may be returned:

$$w_i = [(c_1/b_i) \times r_1 + \ldots + (c_n/b_i) \times r_n]/(\text{rangeSize}/b_i) \times (\text{rangeSize}/b_i) \qquad (21)$$

Therefore, the decoded integer value becomes:

$$x = q_i + (\text{rangeSize}/b_i) \times w_i \qquad (22)$$

Figure 4:
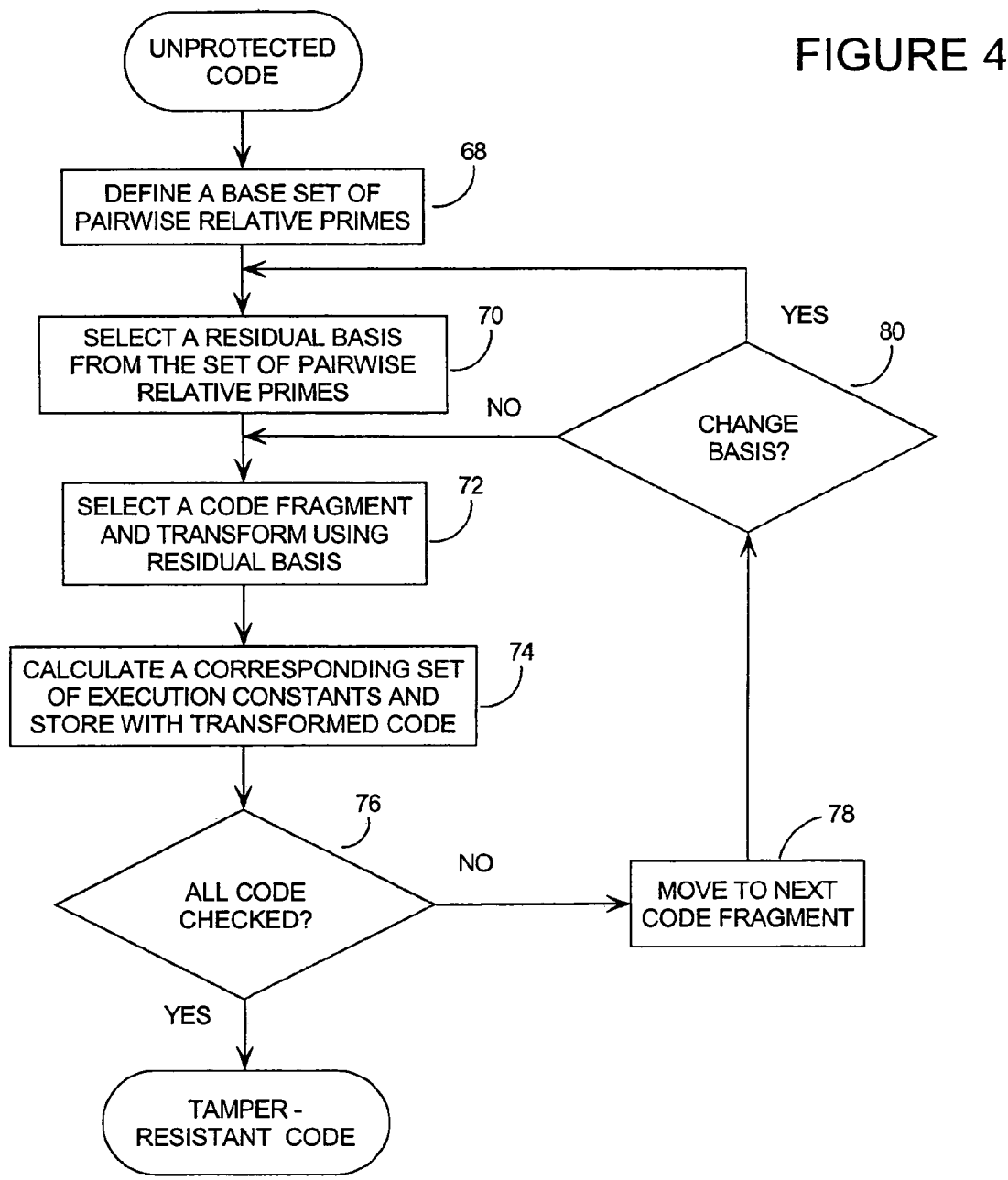
FIG. 4 presents a flow chart of a residue number encoding routine in an embodiment of the invention.

FIG. 4 presents a flow chart of a simple implementation of a Residue Number encoding phase. The routine begins at step 68 by establishing a base set of pairwise relative primes, for example, the set of {16, 9, 5, 7, 11, 13, 17, 19, 23} as presented above. At step 70, a base is computed from this set as previously described, such as {1584, 1495, 2261}. A suitable block of software code is selected from the SSA graph and is transformed into residual form at step 72. If operators are found which are not calculable in the residue domain, then they will be identified in the phase control file, and those operators and their associated variables will be encoded using a different technique. At step 74, a corresponding set of solution constants is then calculated and is stored with the tamper-resistant program. As noted above, these solution constants are needed to execute the program, but do not provide the attacker with information needed to decode the tamper-resistant program.

At step 76, a decision block determines whether the entire SSA graph has been traversed, and if not, the compiler steps incrementally to the next code fragment by means of step 78. At step 80, a determination is made whether to select a new basis from the set of pairwise relative primes by returning to step 70, or to continue with the same set by returning to step 72. Alternatively, one could return to step 68 to create a completely new base set, though this would not generally be necessary.

Once the decision block at step 76 determines that the SSA graph has been traversed, the phase is complete.

With this background, the reader may now consider the new analysis and tamper-resistant encoding techniques of the invention.

New Analysis and Tamper-Resistant Encoding Techniques

The first part of this section is devoted to measuring the resistance of data encodings to reverse engineering. We introduce a measure of encoding resistance in an encoded world as a measure of uncertainty: specifically, the number of possible solutions or 'real' worlds which could correspond to the observable encoded world. An attacker observing only operations in an encoded world and inputs to the encoded world (i.e., all encoded input data) cannot distinguish between any of possible solutions. Thus, the larger the number of corresponding possible solutions (i.e. the size of the "transform space"), the more uncertainty and resistance the encoding has. Only one of these possible solutions, of course, is the correct solution.

In other words, there is a specific original computation to be encoded. It can be encoded according to one of a list of techniques, and for each technique, there are many different computations which might be encoded to exactly the same encoded computation (i.e., the computer instructions are exactly the same, but the significance of the computation varies—the meaning/encoding of the input and output values differs). The number of different computations which could lead to the same instruction sequence constitutes the ambiguity for that technique (an attacker sees exactly the same thing, and then has the problem of resolving the ambiguity among the may possible meanings/encodings for the encoded computation).

We choose encoding techniques which provide sufficient ambiguity, as defined above, to satisfy the security need for the computation to be encoded.

It is important to note that the ambiguity measures characterize the resistance of encoding to an arbitrary attack which only uses information from the encoded world.

We then present estimates of resistance of linear, residue and mixed encodings (i.e. the use of linear and residue encodings in combination) for addition and multiplication and demonstrate that maximal resistance is achieved for mixed encoding. We show that there exist more resistant schemes for performing multiplication in mixed encodings.

We estimate resistance of computation of arbitrary multivariate polynomials in mixed encoding and propose several ways to increase the resistance of arbitrary computation in mixed encoding.

1.0 Introduction: General Scheme of using Encodings in Computations

Below we present a brief overview on the problem of data encodings.

1.1 What are Data Encodings?

Suppose we wish to compute $$y = F(x_1, \ldots, x_n; c_1, \ldots c_m), \tag{23}$$

where:

$x_1, \ldots, x_n$ is the input data, $c_1, \ldots, c_m$ some internal parameters we wish to hide from an attacker by an encoding, $y = (y_1, \ldots, y_t)$ is the output and F is a function for its computation.

Encoding is a parametric collection of functions that map each integer into tuples of integers:

$$x'_{i1} = f_1(x_i) \tag{24}$$
$$\vdots$$
$$x'_{ik} = f_k(x_i)$$
$$c'_{j1} = f_1(c_j)$$
$$\vdots$$
$$c'_{jk} = f_k(c_j) \tag{25}$$

An important additional requirement is that encoding must be consistent with arithmetic operations. This means that for each basic arithmetic operation (+, ×, ÷) there is a sequence of a constant number of operations over the encoded data (which is called a replacing sequence) such that the original arithmetic operation can be derived from the result of replacing sequence of operations by a simple decoding procedure.

Then, instead of (23) we compute $$y'_1 = F'_1(x'_{11}, \ldots, x'_{1k}, \ldots x'_{n1}, \ldots x'_{nk}; c'_{11}, \ldots c_{1k}, \ldots c'_{m1}, \ldots c'_{mk}), \tag{26}$$
$$\vdots$$
$$y'_k = F'_k(x'_{11}, \ldots, x'_{1k}, \ldots x'_{n1}, \ldots x'_{nk}; c'_{11}, \ldots, c'_{1k}, \ldots c'_{m1}, \ldots c'_{mk}),$$

where F' are obtained from F by standard rules (using the encoding that is in consistent with the arithmetic operations used).

Then we apply decoding (the inverse function to encoding) to obtain the original results of the computation.

1.2 A General Scheme of using Encodings in Computations

The following general scheme may be used:

A. Encodings of data. At this stage for all input data we compute their encoded values.

B. Computations with encoded data (Encoded world). At this stage we compute with encoded data by formal rules replacing each basic operation by a sequence of appropriate operations.

C. Decoding of results. At this stage encoded results obtained in computations are decoded.

What are the main advantages of such scheme? Note that Stage B is obtained by an original program being cloaked by simple formal rules (automatically).

Stages A and C compute concrete functions, so they can be implemented once (using identities or other techniques) for all programs being cloaked.

If we are able to hide information on stages A and C by cloaking, then the resistance of the whole scheme will be determined by the resistance of the stage B. By this reasoning it is vital to define what 'resistance to computations' means for the encoded world (Stage B).

1.3 Measure of Resistance of Encodings

We introduce a measure of encoding resistance in the encoded world as a measure of uncertainty. We define the resistance measure as the number of different possible solutions which can correspond to the observable encoded world. An attacker observing only operations in the encoded world and inputs to the encoded world (i.e., all encoded input data) cannot distinguish between any of such possible solutions corresponding to the same encoded world. Therefore, the greater the number of corresponding possible solutions, the greater the uncertainty and resistance of the encoding method.

It is important to note that such a measure characterizes the resistance of encoding to an arbitrary attack (exhaustive search) which uses only information from the encoded world. It means that this measure characterizes absolute resistance.

The aim of introducing measures of resistance is to compare the resistance of different encodings for computations.

2 Definition of a Measure of Encoding Resistance

We wish to compute (23) using the encodings in (24).

The world of possible solutions is a tuple $(c_1, \ldots, c_k, x_1, \ldots, x_n)$ and the encoded world is a tuple of the form:

$$\text{EncodWorld} = (x'_{11}, \ldots, x'_{1k}, \ldots, x'_{nk}, \ldots, x'_{nk}; c'_{11}, \ldots, c'_{1k}, \ldots, c'_{m1}, \ldots, c'_{mk}; F'_1, \ldots, F'_k) \tag{27}$$

Definition. A measure of resistance of a scheme (24)-(26) is the number of different possible solutions $(c_1, \ldots, c_k, x_1, \ldots, x_n)$ which correspond to the same encoded world:

$$\text{EncodWorld} = (x'_{11}, \ldots, x'_{1k}, \ldots, x'_{n1}, \ldots, x'_{nk}; c'_{11}, \ldots, c'_{1k}, \ldots, c'_{m1}, \ldots, c'_{mk}; F'_1, \ldots, F'_k) \tag{28}$$

We will denote it by $R_w = R_w(\text{EncodWorld})$.

An equivalent definition of the measure of resistance of a scheme is as follows:

Definition. A measure of resistance of the scheme (24)-(26) is the number of different possible solutions $(c_1, \ldots, c_k, x_1, \ldots, x_n)$ which can correspond to the same encoded world, i.e. the number of different possible solutions $(c_1, \ldots, c_k, x_1, \ldots, x_n)$ for which we can obtain the same encoded world using the same encoding scheme (the same class of encoding but with other possible encoding parameters).

Examples of estimates of resistance for linear, residue and mixed encodings (i.e. the simultaneous application of both linear and residue encodings) are presented in the following sections.

3 Resistance of Linear Encoding

3.1 Resistance of Linear Encoding of a Sum: $c_1 x_1 + \ldots + c_n x_n$

First let us consider the resistance given by the sum of two variables x and y: $z = c_1 x + c_2 y$.

Let integers x and y be represented in a linear encoding as $$x' = a_1 \cdot x + b_1$$

$$y' = a_2 \cdot y + b_2 \tag{29}$$

and $$c'_1 = \alpha_1 \cdot c_1$$

$$c'_2 = \alpha_2 \cdot c_2 \tag{30}$$

and $$A_1 = \alpha_1 a_1 / m$$

$$A_2 = \alpha_2 a_2 / m \tag{31}$$

where $$m = GCD(\alpha_1 a_1, \alpha_2 a_2) \tag{32}$$

For calculating z in linear encoding we need the following relationship:

$$z' = A_2 \cdot c'_1 \cdot x' + A_1 \cdot c'_2 \cdot y'$$

The observable world is determined by the following parameters: $c'_1$, $c'_2$, x', y', $A_1$, $A_2$ and the number of possible solutions (let us denote it as $R_w$) is the number of solutions of the corresponding system of equations (29-32).

The solution (i.e., one of the possible solutions $R_w$) is a set of values for x, y, $c_1$, $c_2$, $a_1$, $a_2$, $b_1$, $b_2$, $\alpha_1$, $\alpha_2$. Let us denote the range of possible values as K.

We now make the following Propositions.

Proposition 1. For fixed $c'_1$, $c'_2$, x', y', $A_1$, $A_2$, and $a_1$, $a_2$, $c_1$, $c_2$ the number of possible solutions $Rw \geq K^2$.

Proof: The proof follows from the fact note that arbitrary values of x or y are solutions of our system since for any x (y) we can choose $b_1$ ($b_2$) such that the value of x' (y') does not change.

Proposition 2. For fixed $c'_1$, $c'_2$, x', y', $A_1$, $A_2$ and $c'_1$, $c'_2$, x, y the number of possible solutions can be estimated as $Rw \geq K/A$, where A is a range of variation of $a_1$ and $a_2$.

Proof: Note that for some solutions of our system $a_1$, $a_2$ and for any q the values $\hat{a}_1 = q \cdot a_1$ and $\hat{a}_2 = q \cdot a_2$ also give a solution because $A_1$, $A_2$ are the same and there exist $b_1$ and $b_2$ such that x' and y' do not change.

Proposition 3. The number of possible solutions is $R_w \geq K^3 / A$, where A is a range of variation of $a_1$ and $a_2$.

Proof: This proposition follows immediately from Proposition 1 and Proposition 2.

Now we can return to the question of resistance of the sum: $c_1 x_1 + \ldots + c_n x_n$. Basing on the results achieved above it follows that $R_w \geq K^{n+1} / A$, where A is a range of variation of $a_1, \ldots, a_n$.

If $K = 2^{64}$ (the usual range for representing integers in Java) this gives a lower bound of resistance $> 2^{100}$ which seems large enough from the point of computational complexity (enumerating all possible solutions is impossible) and from probabilistic point of view (the probability to guess right parameters is less than $2^{-100}$). This is based on doing an exhaustive search.

3.2 Resistance of Linear Encoding of a Product: $x_1 \ldots x_n$

Now consider the resistance of the product of two variables x and y: $z = x \cdot y$.

Remembering equations (29)

$$x' = a_1 \cdot x + b_1$$

$$y' = a_2 \cdot y + b_2$$

To find z in linear encoding one needs to calculate $$z' = x' \cdot y' - b_2 \cdot x' - b_1 \cdot y' \tag{33}$$

which are related to z by the formula $$z' = f z + g \tag{34}$$

where $$f = a_1 \cdot a_2 \tag{35}$$

and $$g = b_1 \cdot b_2 \tag{36}$$

The observable (encoded) world is determined by the following parameters: $b_1$, $b_2$, x', y' and the number of possible solutions (let us denote it as $R_w$) is the number of solutions of the corresponding system of equations (29) and (34-36). The solution (i.e., one of the possible solutions $R_w$) is a set of values for x, y, $a_1$, $a_1$, $b_1$, $b_2$.

From the equations and the observable data $b_1$ and $b_2$, it follows that $a_1 | (x' - b_1)$ and $a_2 | (y' - b_2)$; where "p|q" means that p divides q; i.e., $q = m \cdot p$ for some integer m. Then we have relations $a_1 \cdot x = x' - b_1$ and $a_2 \cdot y = y' - b_1$; Hence, the following statement holds:

Proposition 4. The resistance $R_w$ for multiplication in linear encoding is equal to the product of the numbers of divisors of the integers $x' - b_1$ and $y' - b_2$.

Note that there are situations when resistance of linear encoding is not enough, namely equal to 1 when integers $x' - b_1$ and $y' - b_2$ are primes. In the latter case an attacker can find all of the parameters of the linear encoding.

4. Resistance of Residue Encoding

The residue encoding of integer x is $$x'_i = x \pmod{p_i}$$

where $p_i$, $i = 1, \ldots, k$ are coprime integers.

The encoded (observable) world is $(x'_1, \ldots, x'_k)$, while the world of possible solutions is $(x, p_1, \ldots p_k)$.

Let $p = p_1 \cdot \ldots \cdot p_k$. The resistance of residue encoding can be estimated via the function $S(p, k)$, where $S(x, k)$ is the number of different representations of integer x as a product of k mutually coprime numbers.

Proposition.

$$R_w \geq S(p, k).$$

This estimation of $R_w$ comes from the evaluation by I. Niven and H. S. Zuckerman in: *An Introduction to the Theory of Numbers*, Wiley, 1980.

5. Alternative Mixed Encoding: Addition and Multiplication

In this section a more resistant method for performing addition and multiplication in a mixed encoding (i.e. a combination of linear and residue encoding) is presented.

Let integers x and y be represented in mixed encodings as $$x'_1 \equiv a_1 \cdot x_1 + b_1 \bmod p_1 \quad (37)$$
$$\vdots$$
$$x'_n \equiv a_n \cdot x_n + b_n \bmod p_n$$

and $$y'_1 \equiv c_1 \cdot y_1 + d_1 \bmod p_1 \quad (38)$$
$$\vdots$$
$$y'_n \equiv c_n \cdot y_n + d_n \bmod p_n$$

and let $GCD(a_k, p_k) = GCD(c_k, p_k) = 1$ for all $k=1, \ldots, n$.

5.1 Addition

Find $\lambda_k$ and $\mu_k$ satisfying the equations:

$$\lambda_k \cdot a_k \equiv 1 \bmod p_k$$
$$\mu_k \cdot c_k \equiv 1 \bmod p_k \quad (39)$$

For each $k$ choose $m_k$ such that $GCD(m_k, p_k) = 1$ and then take two different representatives $m_k^{(1)}$ and $m_k^{(2)}$ of mod $p_k$ class of $m_k$. Then denote:

$$\Lambda_k \equiv m_k^{(1)} \cdot \lambda_k$$
$$M_k \equiv m_k^{(2)} \cdot \mu_k \quad (40)$$

Let $z = x + y$ and we are looking for the sum of two variables $x$ and $y$. To find $z$ in mixed encoding it is sufficient to calculate:

$$z'_1 \equiv \Lambda_1 \cdot x'_1 + M_1 \cdot y'_1 \bmod p_1 \quad (41)$$
$$\ldots$$
$$z'_n \equiv \Lambda_n \cdot x'_n + M_n \cdot y'_n \bmod p_n$$

which are connected to $z = (z_1, \ldots, z_n)$ by the formulas $$z'_1 \equiv f_1 \cdot z_1 + g_1 \bmod p_1 \quad (42)$$
$$\ldots$$
$$z'_n \equiv f_n \cdot z_n + g_n \bmod p_n$$

where $$f_1 \equiv m_1 \bmod p_1 \quad (43)$$
$$\ldots$$
$$f_n \equiv m_n \bmod p_n$$

and $$g_1 \equiv \Lambda_1 \cdot b_1 + M_1 \cdot d_1 \bmod p_1 \quad (44)$$
$$\ldots$$
$$g_n \equiv \Lambda_n \cdot b_n + M_n \cdot d_n \bmod p_n$$

Observable values: an attacker observes only $\Lambda_i$, $M_i$ and variables $x'_i$ and $y'_i$.

Note that the following relations hold:

$$GCD(a_k, p_k) = GCD(c_k, p_k) = 1 \text{ for all } k = 1, \ldots, n. \quad (45)$$

$$\text{For each } k, GCD(m_k, p_k) = 1 \quad (46)$$

$$m_k^{(1)} \equiv m_k^{(2)} \bmod p_k \quad (47)$$
$$\lambda_k \cdot a_k \equiv 1 \bmod p_k \quad (48)$$
$$\mu_k \cdot c_k \equiv 1 \bmod p_k \quad (49)$$
$$\Lambda_k \equiv m_k^{(1)} \cdot \Lambda_k \quad (50)$$
$$M_k \equiv m_k^{(2)} \cdot \mu_k \quad (51)$$
$$x'_1 \equiv a_1 \cdot x_1 + b_1 \bmod p_1 \quad (52)$$
$$\ldots$$
$$x'_n \equiv a_n \cdot x_n + b_n \bmod p_n$$
$$y'_1 \equiv c_1 \cdot y_1 + d_1 \bmod p_1 \quad (53)$$
$$\ldots$$
$$y'_n \equiv c_n \cdot y_n + d_n \bmod p_n$$

The world of possible solutions is $(x, y, a_i, b_i, c_i, d_i, p_i)$.

5.2 Multiplication

Now consider the multiplication of two encoded data elements:

$$x'_1 \equiv a_1 \cdot x_1 + b_1 \bmod p_1 \quad (54)$$
$$\ldots$$
$$x'_n \equiv a_n \cdot x_n + b_n \bmod p_n$$

and $$y'_1 \equiv c_1 \cdot y_1 + d_1 \bmod p_1 \quad (55)$$
$$\ldots$$
$$y'_n \equiv c_n \cdot y_n + d_n \bmod p_n$$

and let $GCD(a_k, p_k) = GCD(c_k, p_k) = 1$ for all $k = 1, \ldots, n$. Then there exist such $\lambda_k$ and $\mu_k$ that $\lambda_k \cdot a_k \equiv 1 \bmod p_k$ and $\mu_k \cdot c_k \equiv 1 \bmod p_k$. Then $\lambda_k \cdot x'_k - \lambda_k \cdot b_k \equiv x_k \bmod p_k$ and $\mu_k \cdot y'_k - \mu_k \cdot d_k \equiv y_k \bmod p_k$.

We have:

$$x_k \cdot y_k = (\lambda_k \cdot x'_k - \lambda_k \cdot b_k) \cdot (\mu_k \cdot y'_k - \mu_k \cdot d_k) = \lambda_k \cdot \mu_k \cdot x'_k \cdot y'_k - \lambda_k \cdot \mu_k \cdot b_k \cdot y'_k - \lambda_k \cdot \mu_k \cdot d_k \cdot x'_k + \lambda_k \cdot \mu_k \cdot b_k \cdot d_k.$$

Multiplying the both sides of the last equation by some $\theta_k \neq 0 \bmod p_k$ we obtain $$\theta_k \cdot x_k \cdot y_k = \theta_k \cdot \lambda_k \cdot \mu_k \cdot x'_k \cdot y'_k - \theta_k \cdot \lambda_k \cdot \mu_k \cdot b_k \cdot y'_k - \theta_k \cdot \lambda_k \cdot \mu_k \cdot d_k \cdot x'_k + \theta_k \cdot \lambda_k \cdot \mu_k \cdot b_k \cdot d_k$$

or $$\theta_k \cdot x_k \cdot y_k - \theta_k \cdot \lambda_k \cdot \mu_k \cdot b_k \cdot d_k = \theta_k \cdot \lambda_k \cdot \mu_k \cdot x'_k \cdot y'_k - \theta_k \cdot \mu_k \cdot b_k \cdot y'_k - \theta_k \cdot \lambda_k \cdot \mu_k \cdot d_k \cdot x'_k$$

Then choose different representatives of $\lambda_k, \mu_k, \theta_k$ and denote $$\theta_k \cdot \lambda_k \cdot \mu_k \equiv \alpha_k \bmod p_k,$$
$$\theta_k \cdot \lambda_k \cdot \mu_k \cdot b_k \equiv \beta_k \bmod p_k,$$
$$\theta_k \cdot \lambda_k \cdot \mu_k \cdot d_k \equiv \gamma_k \bmod p_k,$$
$$\theta_k \cdot \lambda_k \cdot \mu_k \cdot b_1 \cdot d_1 \equiv \delta_k \bmod p_k.$$

Then we get a formula for multiplication of integers represented in mixed encoding:

$$\theta_k \cdot x_k \cdot y_k - \delta_k \equiv \alpha_k \cdot x'_k \cdot y'_k - \beta_k \cdot y'_k - \gamma_k \cdot x'_k \bmod p_k$$

Observable values: $(x', y', \alpha_i, \beta_i, \gamma_i)$.

The world of possible solutions is $(x, y, a_i, b_i, c_i, d_i, p_i)$.

6 Resistance of Alternative Mixed Encoding

6.1 Resistance of a Sum $A_1x_1 + \ldots + A_nx_n$

Firstly let us consider the resistance of the sum of two variables x and y: $z=x+y$.

Let integers x and y be represented in mixed encoding as $$x'_1 \equiv a_1 \cdot x_1 + b_1 \bmod p_1 \quad (56)$$
$$\ldots$$
$$x'_n \equiv a_n \cdot x_n + b_n \bmod p_n$$

and $$y'_1 \equiv c_1 \cdot y_1 + d_1 \bmod p_1 \quad (57)$$
$$\ldots$$
$$y'_n \equiv c_n \cdot y_n + d_n \bmod p_n$$

and let $$GCD(a_k, p_k) = GCD(c_k, p_k) = 1 \quad (58)$$

for $k=1, \ldots, n$.

Find $\lambda_k$ and $\mu_k$ satisfying equations $$\lambda_k \cdot a_k \equiv 1 \bmod p_k, \; \mu_k \cdot c_k \equiv 1 \bmod p_k \quad (59)$$

For each k we choose $m_k^{(1)}$ and $m_k^{(2)}$ such that:

$$GCD(m_k^{(1)}, p_k) = GCD(m_k^{(2)}, p_k) = 1 \quad (60)$$

and $$m_k^{(1)} \cdot m_k^{(2)} \bmod p_k \quad (61)$$

Now choose:

$$\Lambda_k \equiv m_k^{(1)} \cdot \lambda_k \bmod p_k$$
$$M_k \equiv m_k^{(2)} \cdot \mu_k \bmod p_k \quad (62)$$

In a mixed encoding for finding the encoded z we will calculate:

$$z'_1 = \Lambda_1 x'_1 + M_1 y'_1 \ldots$$
$$z'_n = \Lambda_n x'_n + M_n y'_n \quad (63)$$

Earlier we introduced a measure of encoding resistance in the encoded world as the number of possible solutions which can correspond to the observable encoded world. Note that in this case the observable world consists of the following parameters: $\Lambda_k, M_k, x'_k, y'_k$ $(k=1, \ldots, n)$ and the number of possible solutions (let us denote it as $R_w$) is the number of solutions of the corresponding system of equations (56-63). The solution (i.e., one of the possible solutions $R_w$) is a set of values for $x_k, y_k, a_k, b_k, p_k$ $(k=1, \ldots, n)$. Now we will estimate $R_w$.

Proposition 1. For fixed $\Lambda_k$; $M_k$, $x'_k$, $y'_k$ and $a_k$, $p_k$ $(k=1, \ldots, n)$ the number of possible solutions $R_w \geq p^2$, where $p=p_1 \cdot p_2 \cdot \ldots \cdot p_n$.

Proof: To prove this we note that any values of $x_k$ or $y_k$ (0, 1, 2, \ldots, $p_k-1$) will give a solution of our system as for any $x_k$ ($y_k$) we can choose such $b_k$ ($d_k$) that the value of $x'_k$ ($y'_k$) does not change.

Proposition 2. For fixed $x'_k, y'_k$ and $x_k, y_k$ $(k=1, \ldots, n)$ the number of possible solutions is $R_w \geq 2^{2n}$, where $p=p_1 \cdot p_2 \cdot \ldots \cdot p_n$.

Proof: It is known that $\Lambda_k = m_k^{(1)} \cdot \lambda_k$ and $M_k = m_k^{(2)} \cdot \mu_k$. One can check that there exists such solutions:

$(m_k^{(1)}, m_k^{(2)}, \lambda_k, \mu_k) = (1, 1, \lambda_k, M_k)$;

$(m_k^{(1)}, m_k^{(2)}, \lambda_k, \mu_k) = (1, M_k, \lambda_k, 1)$;

$(m_k^{(1)}, m_k^{(2)}, \lambda_k, \mu_k) = (\lambda_k, 1, 1, M_k)$;

$(m_k^{(1)}, m_k^{(2)}, \lambda_k, \mu_k) = (\lambda_k, M_k, 1, 1)$.

Proposition 3. The number of possible solutions is $R_w \geq 2^{2n} \cdot p^2$.

Proof: This proposition is a corollary of Proposition 1 and 2.

Now we can state a more general variant of the second proposition:

Proposition 4. For constant $x'_k, y'_k$ and $x_k, y_k$ $(k=1, \ldots, n)$ for any $\Lambda_k^{(1)}, \Lambda_k^{(2)}$ ($M_k^{(1)}, M_k^{(2)}$) such that $\Lambda_k = \Lambda_k^{(1)} \cdot \Lambda_k^{(2)}$ ($M_k = M_k^{(1)} \cdot M_k^{(2)}$) there exists a solution of our system such that $m_k^{(1)} = \Lambda_k^{(1)}$ and $\lambda_k = \Lambda_k^{(2)}$ ($m_k^{(2)} = M_k^{(1)}$ and $\mu_k = M_k^{(2)}$).

As we can see, the greater the number of divisors of $\Lambda_k$ and $M_k$ is, the greater is the number of possible solutions. Note that during these computations we can choose $m_k^1$ and $m_k^2$. So using $m_k^1$ and $m_k^2$ with large numbers of divisors can greatly increase the resistance of the computations. If for any k the number of divisors of $\Lambda_k$ and $M_k$ is at least q then $R_w \geq q^{2n} \cdot p^2$.

Now returning to the question of resistance of the sum: $A_1 x_1 + \ldots + A_m x_m$. Based on the results obtained above it is possible to prove that $R_w \geq 2^{2n} \cdot p^m$.

Some improvement of the statement claimed in Proposition 2 is possible; indeed, it is possible to prove that $R_w \geq (n! + 2^{2n} - 1) \cdot p^2$.

Proof: It is known that $\Lambda_k = m_k^{(1)} \cdot \lambda_k$ and $M_k = m_k^{(2)} \cdot \mu_k$. One may check that there exists solutions:

$(m_k^{(1)}, m_k^{(2)}, \lambda_k, \mu_k) = (1, 1, \Lambda_k, M_k)$;

$(m_k^{(1)}, m_k^{(2)}, \lambda_k, \mu_k) = (1, M_k, \Lambda_k, 1)$;

$(m_k^{(1)}, m_k^{(2)}, \lambda_k, \mu_k) = (\Lambda_k, 1, 1, M_k)$;

$(m_k^{(1)}, m_k^{(2)}, \lambda_k, \mu_k) = (\Lambda_k, M_k, 1, 1)$.

We note that in the case $(m_k^{(1)}, m_k^{(2)}, \lambda_k, \mu_k) = (1, 1, \Lambda_k, M_k)$, the number of solutions $R_w \geq n!$; in this case we have $\lambda_k = \Lambda_k$ and $\mu_k = M_k$, thus, $\Lambda_k \cdot a_k \equiv 1 \bmod p_k$ and $M_k \cdot c_k \equiv 1 \bmod p_k$.

Let us propose that $p = p_1 \cdot p_2 \cdot \ldots \cdot p_n$ and p is fixed and the value of its divisors is also fixed but not the place (i.e., i).

This means that we have n! variants of the order for $p_i$, and for each variant we have one more solution.

6.2 Resistance of a Product $_{y_1}^{\alpha 1} \ldots y_t^{\alpha t}$

First consider the resistance of the product of two variables x and y: $z = x \cdot y$.

Recall the representation in mixed encoding per equations (56-57):

$$x'_1 = a_1 \cdot x_1 + b_1 \bmod p_1$$
$$\ldots$$
$$x'_n = a_n \cdot x_n + b_n \bmod p_n$$

and $$y'_1 = c_1 \cdot y_1 + d_1 \bmod p_1$$
$$\ldots$$
$$y'_n = c_n \cdot y_n + d_n \bmod p_n$$

and let $GCD(a_k, p_k) = GCD(c_k, p_k) = 1$ for all $k=1, \ldots, n$. Then there exist such $\lambda_k$ and $\mu_k$ that $\lambda_k \cdot a_k \equiv 1 \bmod p_k$ and $\mu_k \cdot c_k \equiv 1 \bmod p_k$. Then $\lambda_k \cdot x'_k - \lambda_k \cdot b_k \equiv x_k \bmod p_k$ and $\mu_k \cdot y'_k - \mu_k \cdot d_k \equiv y_k \bmod p_k$.

Then we have:

$$x_k \cdot y_k \equiv (\lambda_k \cdot x'_k - \lambda_k \cdot b_k) \cdot (\mu_k \cdot y'_k - \mu_k \cdot d_k) \equiv \lambda_k \mu_k x'_k y'_k - \lambda_k \mu_k b_k x'_k + \lambda_k \mu_k b_k d_k.$$

Multiply the both sides of the last equation by some $\theta_k \neq 0 \bmod p_k$. Then we have:

$$\theta_k \cdot x_k \cdot y_k \equiv \theta_k \lambda_k \mu_k x'_k y'_k - \theta_k \lambda_k \mu_k b_k y_k - \theta_k \lambda_k \mu_k d_k x'_k \mu_k b_k d_k.$$

or $$\theta_k \cdot x_k y_k - \theta_k \lambda_k \mu_k b_k d_k \equiv \theta_k \lambda_k \mu_k x'_k y'_k - \theta_k \lambda_k \mu_k b_k y'_k - \theta_k \lambda_k \mu_k d_k x'_k$$

Then choose different representations of $\lambda_k, \mu_k, \theta_k$ and denote:

$$\theta_k \cdot \lambda_k \cdot \mu_k \equiv \alpha_k,$$

$$\theta_k \cdot \lambda_k \cdot \mu_k \cdot b_k \equiv \beta_k,$$

$$\theta_k \cdot \lambda_k \cdot \mu_k \cdot d_k \equiv \gamma_k \text{ and}$$

$$\theta_k \cdot \lambda_k \cdot \mu_k \cdot b_1 \cdot d_1 \equiv \delta_k$$

Thus, we obtain:

$$\theta_k \cdot x_k \cdot y_k - \delta_k \equiv \alpha_k \cdot x'_k y'_k - \beta_k \cdot y'_k - \gamma_k \cdot x'_k$$

The observable world in this case is determined by the following parameters: $(\alpha_k, \beta_k, \gamma_k)$ for all $k=1, \ldots, m$.

Proposition 5. For fixed $\alpha_k, \beta_k, \gamma_k, x'_k, y'_k$ and $b_k, d_k$ ($k=1, \ldots, n$) the number of possible solutions $R_w \geq \phi^2(p)$, where $p = p_1 \cdot p_2 \cdots p_n$ and $\phi(N)$ is the Euler function which is the number of positive integers coprime with (positive integer) $N$ and less then $N$.

Proof. From definition of multiplication in mixed encoding the following equations hold $$x'_k - b_k \equiv a_k x_k \bmod p_k$$

$$y'_k - d_k \equiv c_k y_k \bmod p_k \qquad (64)$$

and $$\alpha_k \equiv \theta_k a_k^{-1} c_k^{-1} \bmod p_k$$

$$\beta_k \equiv \alpha_k b_k \bmod p_k$$

$$\gamma_k \equiv \alpha_k d_k \bmod p_k \qquad (65)$$

We can choose $\phi^2(p_k)$ solutions of equations $a_k x_k \equiv q_k \bmod p_k$ and $c_k y_k \equiv q'_k \bmod p_k$ for fixed $q_k$ and $q'_k$ taking arbitrary $a_k$ and $c_k$ which are coprime to $p_k$. Then there exists $\phi_2(p_k)$ solutions of equations (64-65) for any fixed $\alpha_k, \beta_k, \gamma_k, x'_k, y'_k$ and $b_k, d_k$. As $p_k$ are mutually coprime and the Euler function is multiplicative, the number of all possible solutions for all $p_1, \ldots, p_n$ then is $(\phi(p_1) \ldots \phi(p_n))^2 = \phi^2(p_1 \ldots p_n) = \phi^2(p)$.

Returning to the question of resistance of the product of independent variables: $x_1 \ldots x_m$. Based on the results above, it can be shown that $R_w \geq \phi^m(p)$, where $p = p_1 \cdot p_2 \cdots p_n$ To avoid technical difficulties in estimating resistance of the product $y_1^{\alpha 1} \cdots y_t^{\alpha t}$ we introduce multiple encodings of the same input data. This means that every new appearance of input variable will be encoded with independent parameters as a new variable. For example, in the formula $y=x^2$, variable $x$ will be encoded twice with different parameters and we can consider the encoded formula as the product of independent variables.

In this way, we reduce the problem of estimating the resistance of $y_1^{\alpha 1} \cdots y_t^{\alpha t}$ to estimating the resistance of the product of independent variables $z_1 \cdots z_T$, where $$T = \sum_{i=1}^{t} \alpha_i,$$

$\alpha_i$, and obtain an estimate of the resistance $R_w$ of the product $y_1^{\alpha 1} \cdots y_t^{\alpha t}$ as:

$$R_w \geq \phi^T(p)$$

6.3 Resistance of Polynomials of Several Variables ("Multinomials")

In this section we estimate resistance of general computations with integers containing both additions and multiplications.

Let us consider a multivariate polynomial $$P(x_1, \ldots, x_n) = \sum_{a=(a_1, \ldots, a_n)} c_a x_1^{a_1} \cdots x_n^{a_n}$$

and assume that we wish to hide some of its coefficients from an attacker by mixed encoding. Let N be the number of summands in the above formula.

Let us consider the following way to compute a polynomial P:

1. in each monomial compute all multiplications of variables;
2. multiply them by corresponding coefficients $c_a$;
3. compute P performing N additions of obtained results.

We again use multiple encodings of the same input data: every new appearance of each input variable will be encoded with independent parameters as a new variable. This reduces the problem of estimating resistance of a polynomial P to the problem of estimating resistance of the sum of variables:

$$c_1 y_1 + \ldots + c_N y_N,$$

where N is the number of summands in the formula for P, each $y_i$ is the product of independent variables and sets of such variables are disjoint for any pair $y_i, y_j$.

In a manner similar to that used to obtain the results for resistance of the product of independent variables (Section 6.2) and the results for resistance of linear combination of independent variables (Section 6.1) in mixed encoding we, can prove the following:

Proposition. The resistance $R_w$ of computing $P(x_1, \ldots, x_n)$ can be estimated as:

$$R_w \geq \phi^s(p)$$

where $$S = \sum_{i=1}^{N} m_i - N,$$

$m_i - N$, $m_i$ is the number of independent variables in the ith summand, N is the number of summands and $\phi(n)$ is the Euler function.

7. Exemplary Implementations

General implementations of the invention will now be presented.

Broadly speaking, the analysis technique of the invention could be applied for successive fragments of code by performing the following steps:

1. first, computing the ambiguity measures for various encodings;
2. then selecting the particular encoding the an ambiguity level sufficient to meet the security needs; and then
3. applying the selected encoding to the code fragment.

The same steps are then performed for the remaining fragments in the targeted set of code, to arrive at a tamper-resistant set of code.

Figure 5:
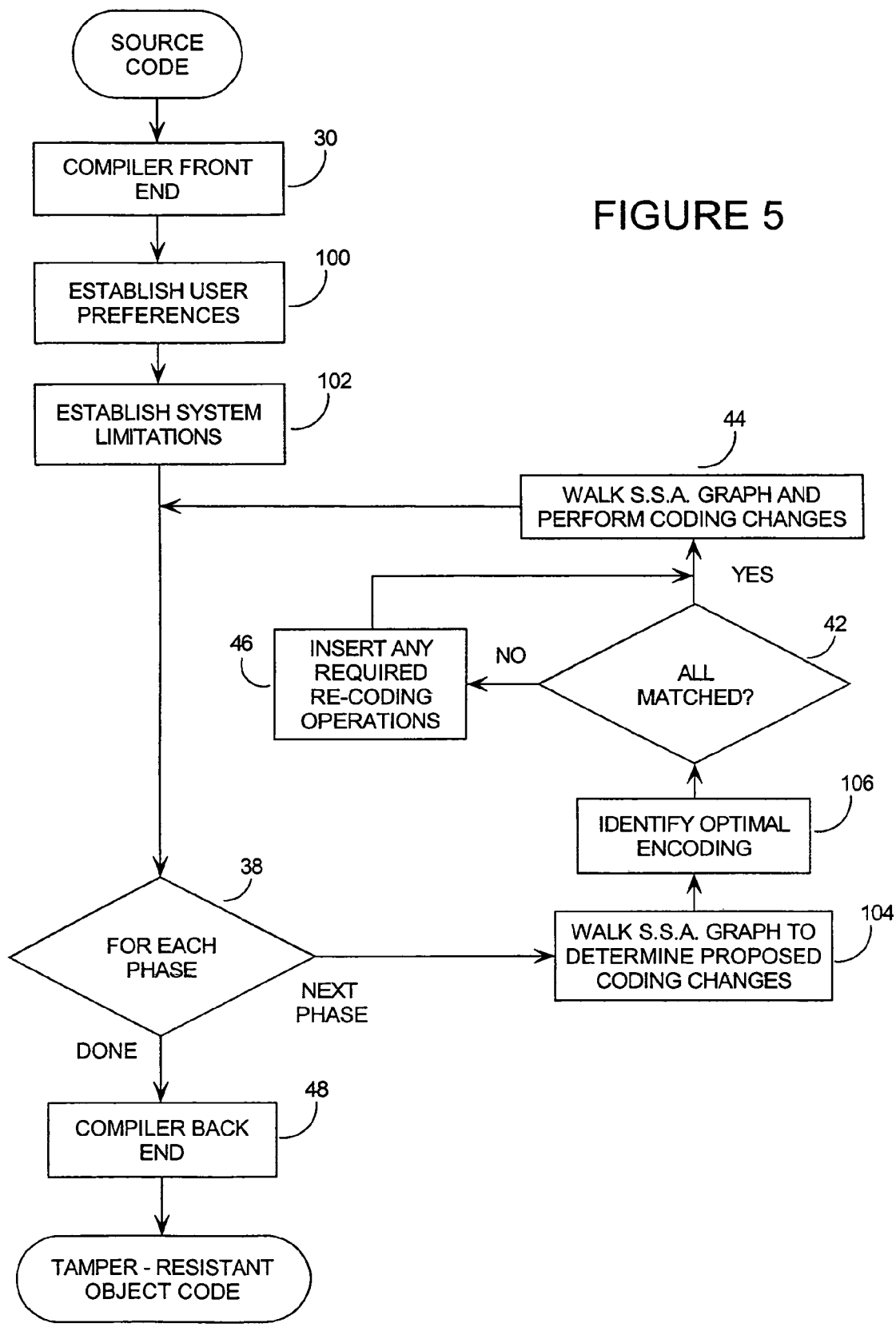
FIG. 5 presents a flow chart of a routine for analysing the effectiveness of particular tamper-resistant techniques in an embodiment of the invention.

Clearly, the analysis system of the invention could easily be incorporated into a routine such as that of FIG. 2 simply by adding some further steps. Such a routine is presented in the flow chart of FIG. 5.

This routine begins at step 30 by converting the targeted software code to SSA form using a compiler front end. The parameters which define the bounds of possible encodings are then established at steps 100 and 102. While the discussion of the invention has focussed mainly on the effectiveness of the various encoding techniques, there are other considerations that may affect which technique is used in a certain application. For example, it may be desirable to consider:

4. the degree to which different encodings cause code expansion; and
5. the increased processing burden.

Certain parameters will be set as a matter of user preference, while others will be limited by the platform or application (such as the bit width of an operating system or Smart card, or the allowable processing time to maintain realtime performance). These parameters would be established at steps 100 and 102 respectively.

Next, the routine considers each phase of the SSA code at step 38, as described above. For each phase, the routine walks the SSA graph at step 104, collecting the data necessary to effect the proposed encoding, and also to perform the effectiveness calculations.

The effectiveness calculations are then performed at step 106, and an optimal encoding is identified. As noted above, the selection of an optimal encoding may turn on a number of factors in addition to the overall effectiveness.

Steps 42, 44 and 46 are then performed as described above, affecting the optimal encoding on the targeted software.

Once all phase have been encoded, the SSA graph is converted to executable object code by means of a compiler back end, at step 48, completing the routine.

In section 6.3, we analysed the resistance of polynomial equations with several variables. These multinomials occur commonly in computations underlying many applications, such as:

- task or job-shop scheduling problems involving areas or volumes to be processed with fixed personnel (such as installing floor tiles);
- bank interest calculations for fixed numbers of interest intervals;
- curve-fitting, where we try to find a formula which fits observed data;
- ballistics;
- computer graphics; and
- approximations for many other kinds of computations, where we use the multinomial approximation to avoid a much more expensive, precise calculation.

Multinomial encoding can be applied to any of the above because a multinomial encoding of a multinomial is itself a multinomial; i.e., we replace an unencoded multinomial with an encoded one.

Since ordinary additions, subtractions, multiplications, and exponentiations, are just very simple instances of multinomials, multinomial encoding can be applied to such ordinary computations as well: the multinomial encoding of a multinomial (however simple) is itself a multinomial.

Wherever polynomials of one or several variables occur in computations, we can apply the multinomial technique, and compute its ambiguity using the formula given in section 6.3 above.

Figure 6:
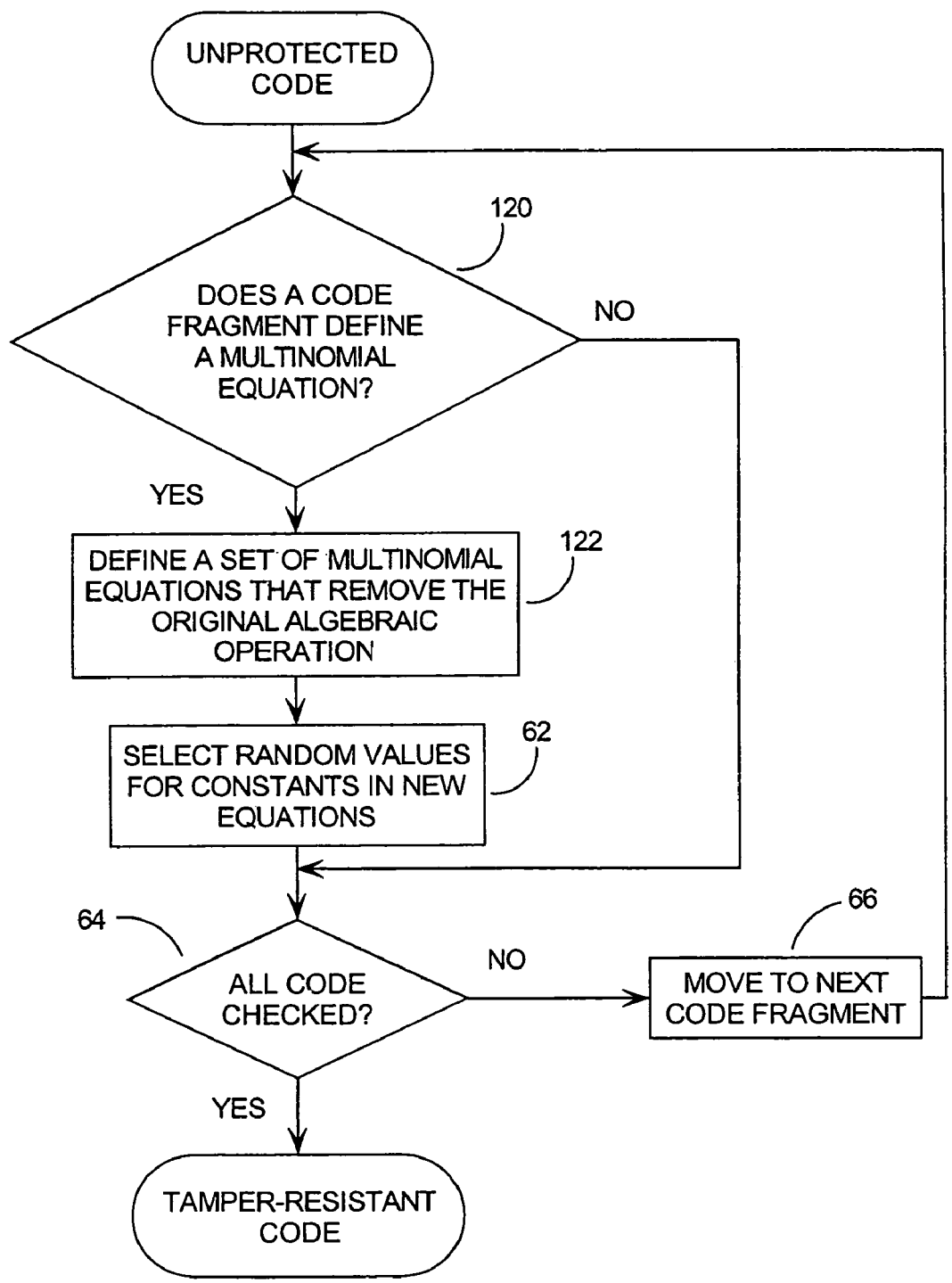
FIG. 6 presents a flow chart of a routine for applying the multinomial encoding technique in an embodiment of the invention.

FIG. 6 presents a flow chart of simple implementation of an algorithm for effecting the multinomial encoding technique. This routine is much like that of FIG. 3, described above. First, at step 120, a fragment of code from the SSA graph is analysed to determine whether it defines a multinomial equation suitable for multinomial encoding. If so, a suitable set of multinomial equations are defined at step 122 that accomplishes the desired encoding.

Like the case of the polynomial encoding, the values of constants are generally unrestricted, the main concern being that the constants are smaller enough to avoid overflow. Thus, the values of constants in the encoding equations may be selected randomly at step 62, within the allowable constraints of the program. At the decision block of step 64 it is then determined whether the entire SSA graph has been traversed, and if not, the compiler steps incrementally to the next code fragment by means of step 66. Otherwise, the phase is complete.

Variations on this technique would be clear to one skilled in the art.

Figure 7:
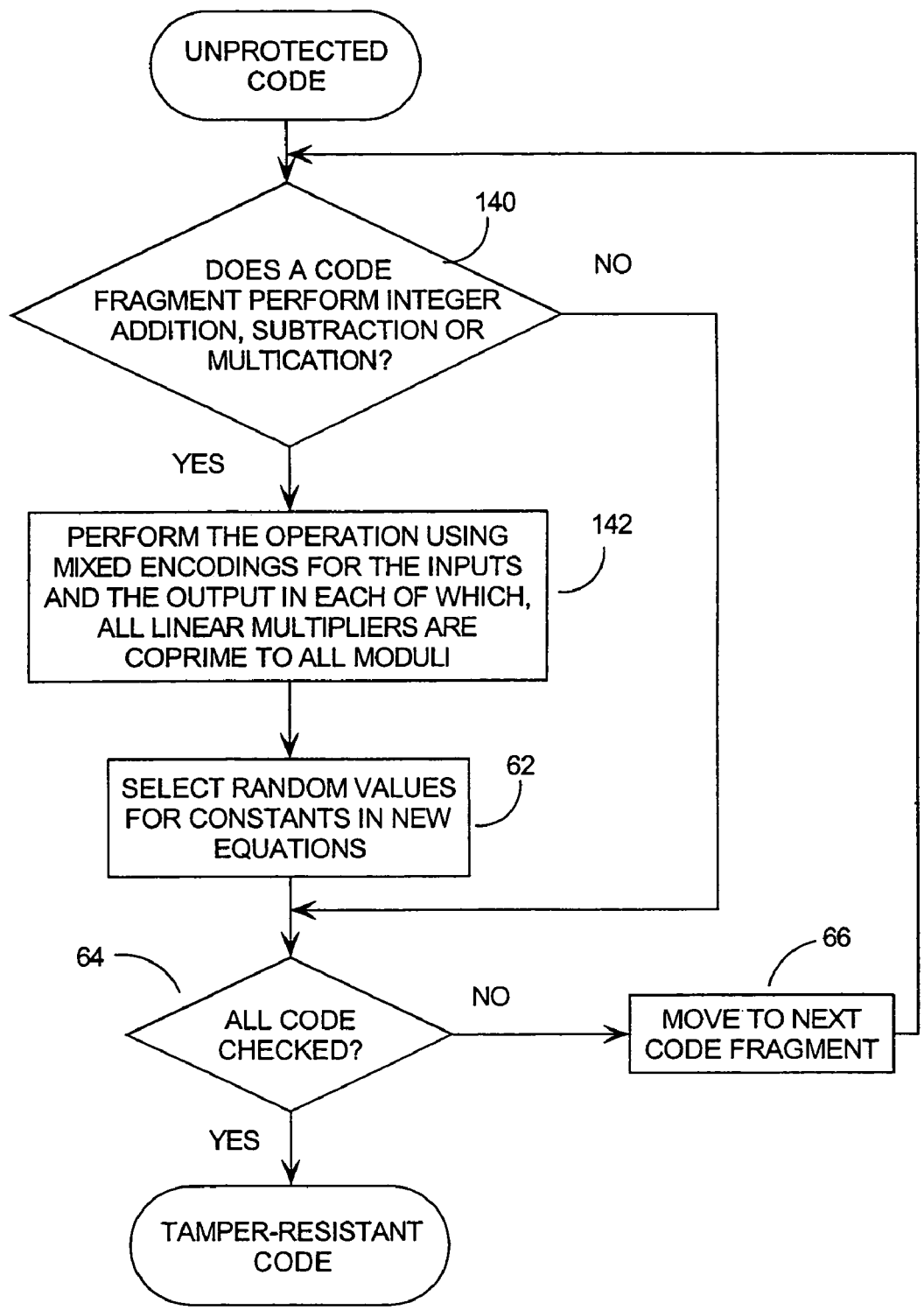
FIG. 7 presents a flow chart of a routine for applying the alternative mixed encoding technique in an embodiment of the invention.

Similarly, the "alternative mixed encoding technique" described in section 5 can also be implemented using a routine similar to that presented in FIGS. 3 and 6. Such a routine is presented in the flow chart of FIG. 7.

First, at step 140, a fragment of code from the SSA graph is analysed to determine whether it performs integer addition, subtraction of multiplication. If so, a suitable set of mixed encodings are defined at step 142, where, for the inputs and the output in each of which all linear multipliers are coprime to all moduli.

Like the other encodings described above, the values of constants in the encoding equations are then randomly selected at step 62, within the allowable constraints of the program.

At the decision block of step 64 it is then determined whether the entire SSA graph has been traversed, and if not, the compiler steps incrementally to the next code fragment by means of step 66. Otherwise, the phase is complete.

Variations on this technique would be clear to one skilled in the art.

8. Summary and Future Work

This report is devoted to measures of the resistance of data encodings. We introduced a measure of encoding resistance in the encoded world as a measure of uncertainty, that is, the number of possible solutions which can correspond to the observable encoded world. An attacker observing only operations in encoded world and inputs to encoded world (i.e., all encoded input data) cannot distinguish between any of the possible solutioris, hence, the larger the number of corresponding possible solutions, the more uncertainty and resistance of encoding.

It is important to note that such measures characterize the resistance of encoding to an arbitrary attack (exhaustive search) which uses only information from the encoded world.

We have presented estimates of resistance of linear, residue and mixed encodings for addition and multiplication, and shown that the maximal resistance is obtained with mixed encoding. More resistant schemes for performing multiplication in mixed encoding have also been shown.

We have estimated the resistance of computation of arbitrary multivariate polynomial in mixed encoding and proposed several ways to increase the resistance of arbitrary computations in mixed encoding.

This report is preliminary and there are many possibilities for technical improvements for some of the estimates presented.

The following observations will aid in the performance of future work:
1. Dependence of resistance on the algorithm
   Resistance can depend on the algorithm, so it is desirable to find the most resistant schemes of computations.
2. Multiple Encodings
   It is of interest to determine how to increase resistance of computations when some variable x appears several times in a computation. One possible way is to use multiple encodings for x. We have used this method to estimate the resistance of arbitrary multivariate polynomial in mixed encoding.

Wide Applications

Tamper-resistant encoding in a manner of the invention has very wide possible uses:
1. Protecting the innovation of a software algorithm. For example, if one wished to sell software containing a new and faster algorithm to solve the linear programming problem, one would like to sell the software without disclosing the method.
2. Protecting the innovation of a software model. In hardware design, it is common for vendors of ASIC cell libraries to provide precise software models so that users can perform accurate system simulations. However, it would be desirable to do so without giving away the actual cell design.
3. Wrapping behaviour together. Often, it is desirable to write some software that will perform a function "A" if and only if an event "B" occurs. For example, a certain function is performed only if payment is made.
4. Hiding secrets, such as adding encryption keys or electronic signatures into a program, so that the program can sign things and encrypt/decrypt things, without leaking the key.

Clearly, there are other applications and combinations of applications. For example, an electronic key could be included in a decoder program and the decoding tied to electronic payment, thereby providing an electronic commerce solution.

While particular embodiments of the present invention have been shown and described, it is clear that changes and modifications may be made to such embodiments without departing from the true scope and spirit of the invention.

It is understood that as de-compiling and debugging tools become more and more powerful, the degree to which the techniques of the invention must be applied to ensure tamper protection, will also rise. As well, the concern for system resources may also be reduced over time as the cost and speed of computer execution and memory storage capacity continue to improve.

These improvements in system resources will also increase the attacker's ability to overcome the simpler tamper-resistance techniques included in the scope of the claims. It is understood, therefore, that the utility of some of the simpler encoding techniques that fall within the scope of the claims, may correspondingly decrease over time. That is, just as in the world of cryptography, increasing key-lengths become necessary over time in order to provide a given level of protection, so in the world of the instant invention, increasing complexity of encoding will become necessary to achieve a given level of protection.

As noted above, it is also understood that computer control and software is becoming more and more common. It is understood that software encoded in the manner of the invention is not limited to the applications described, but may be applied to any manner of the software stored, or executing.

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

It would also be clear to one skilled in the art that this invention need not be limited to the existing scope of computers and computer systems. Credit, debit, bank and smart cards could be encoded to apply the invention to their respective applications. An electronic commerce system in a manner of the invention could for example, be applied to parking meters, vending machines, pay telephones, inventory control or rental cars and using magnetic strips or electronic circuits to store the software and passwords. Again, such implementations would be clear to one skilled in the art, and do not take away from the invention.

What is claimed is:

1. An improved method of increasing the tamper-resistance and obscurity of computer software code comprising the steps of:
   a) compiling unencoded original computer code into a data-flow-oriented form intermediate code;
   b) selecting an encoding technique for a code fragment from said intermediate code;
   c) determining a calculable measure of resistance for said encoding technique; and
   d) in the event said measure of resistance satisfies a predetermined security requirement, applying said encoding technique to said code fragment to produce an encoded code fragment;
   whereby said measure of resistance is an accurate measure of the size of the search space which an attacker must search when attempting to decode said encoded code fragment, thereby providing a measure of the workload faced by said attacker to achieve such decoding for improving security; and
   wherein said step c) comprises:
      calculating the number of possible candidate code fragments that correspond to said encoding technique for the linear encoding of a sum: $R_w \geq K^{n+1}/A$, where:

$R_w$ is the number of possible candidate code fragments;

K is the range of variable in the system;

n is the number of encoded variables which are summed together in the linear encoding; and A is the range of variables of $a_1, \ldots, a_n$.

2. An improved method of increasing the tamper-resistance and obscurity of computer software code comprising the steps of:

a) compiling unencoded original computer code into a data-flow-oriented form intermediate code;

b) selecting an encoding technique for a code fragment from said intermediate code;

c) determining a calculable measure of resistance for said encoding technique; and d) in the event said measure of resistance satisfies a predetermined security requirement, applying said encoding technique to said code fragment to produce an encoded code fragment;

whereby said measure of resistance is an accurate measure of the size of the search space which an attacker must search when attempting to decode said encoded code fragment, thereby providing a measure of the workload faced by said attacker to achieve such decoding for improving security; and wherein step c) comprises:

calculating the number of possible candidate code fragments that correspond to said encoding technique for the linear encoding of a product: Rw equal to the product of the numbers of divisors of the integers $x'-b_1$ and $y'-b_2$ where:

Rw is the number of possible candidate code fragments;

$x'=a_1*x+b_1$; and $y'=a_2*y+b_2$.

3. An improved method of increasing the tamper-resistance and obscurity of computer software code comprising the steps of:

a) compiling unencoded original computer code into a data-flow-oriented form intermediate code;

b) selecting an encoding technique for a code fragment from said intermediate code;

c) determining a calculable measure of resistance for said encoding technique; and d) in the event said measure of resistance satisfies a predetermined security requirement, applying said encoding technique to said code fragment to produce an encoded code fragment;

whereby said measure of resistance is an accurate measure of the size of the search space which an attacker must search when attempting to decode said encoded code fragment, thereby providing a measure of the workload faced by said attacker to achieve such decoding for improving security; and wherein step c) comprises:

calculating the number of possible candidate code fragments that correspond to said encoding technique for a residue encoding: $R_w \geq S(p, k)$, where:

Rw is the number of possible candidate code fragments;

$p=p_1 \ldots p_k$; and

S (x, k) is the number of different representations of integer x as a product of k mutually coprime numbers.

4. An improved method of increasing the tamper-resistance and obscurity of computer software code comprising the steps of:

a) compiling unencoded original computer code into a data-flow-oriented form intermediate code;

b) selecting an encoding technique for a code fragment from said intermediate code;

c) determining a calculable measure of resistance for said encoding technique; and d) in the event said measure of resistance satisfies a predetermined security requirement, applying said encoding technique to said code fragment to produce an encoded code fragment;

whereby said measure of resistance is an accurate measure of the size of the search space which an attacker must search when attempting to decode said encoded code fragment, thereby providing a measure of the workload faced by said attacker to achieve such decoding for improving security; and wherein step c) comprises:

calculating the number of possible candidate code fragments that correspond to said encoding technique for the residue encoding of a sum: $R_w \geq (n!+2^{2n}-1) * p^2$, where:

$R_w$ is the number of possible candidate code fragments;

$p=p_1 \cdot p_2 \cdots p_n$; and n is the number of elements that are being summed together.

5. An improved method of increasing the tamper-resistance and obscurity of computer software code comprising the steps of:

a) compiling unencoded original computer code into a data-flow-oriented form intermediate code;

b) selecting an encoding technique for a code fragment from said intermediate code;

c) determining a calculable measure of resistance for said encoding technique; and d) in the event said measure of resistance satisfies a predetermined security requirement, applying said encoding technique to said code fragment to produce an encoded code fragment;

whereby said measure of resistance is an accurate measure of the size of the search space which an attacker must search when attempting to decode said encoded code fragment, thereby providing a measure of the workload faced by said attacker to achieve such decoding for improving security; and wherein step c) comprises:

calculating the number of possible candidate code fragments that correspond to said encoding technique for the residue encoding of a product: $R_w \geq \phi_T(p)$, where:

Rw is the number of possible candidate code fragments;

$p=p_1 \cdot p_2 \cdots p_n$;

$\phi(N)$ is the Euler function which is the number of positive integers coprime with (positive integer) N and less then N; and $$T = \sum_{i=1}^{t} a_i.$$

6. An improved method of increasing the tamper-resistance and obscurity of computer software code comprising the steps of:

a) compiling unencoded original computer code into a data-flow-oriented form intermediate code;

b) selecting an encoding technique for a code fragment from said intermediate code;

c) determining a calculable measure of resistance for said encoding technique; and d) in the event said measure of resistance satisfies a predetermined security requirement, applying said encoding technique to said code fragment to produce an encoded code fragment;

whereby said measure of resistance is an accurate measure of the size of the search space which an attacker must search when attempting to decode said encoded code fragment, thereby providing a measure of the workload faced by said attacker to achieve such decoding for improving security; and wherein step c) comprises:

calculating the number of possible candidate code fragments that correspond to said encoding technique for encoding using polynomials of several variables:

$R_w \geq \phi S; (p)$, where:

$R_w$ is the number of possible candidate code fragments;

$p = p_1 \cdot p_2 \cdots p_n$;

$\phi(N)$ is the Euler function which is the number of positive integers coprime with (positive integer) N and less than N; and $$S = \sum_{i=1}^{N} m_i - N,$$

$m_i$ is the number of independent variables in the ith summand, and N is the number of summands.

7. An improved method of increasing the tamper-resistance and obscurity of computer software code comprising the steps of:

a) compiling unencoded original computer code into a data-flow-oriented form intermediate code;

b) selecting an encoding technique for a code fragment from said intermediate code;

c) determining a calculable measure of resistance for said encoding techniques;

d) in the event said measure of resistance satisfies a predetermined security requirement;

e) applying said encoding technique to said code fragment to produce an encoded code fragment; and f) repeating steps b) through e) to produce multiple encoded code fragments;

whereby said measure of resistance is an accurate measure of the size of the search space which an attacker must search when attempting to decode the particular encoded code fragment, thereby providing a measure of the workload faced by said attacker to achieve such decoding for improving security; and wherein step c) comprises:

calculating the number of possible candidate code fragments that correspond to said encoding techniques for the linear encoding of a sum: $Rw \geq K^{n+1}/A$, where:

Rw is the number of possible candidate code fragments;

K is the range of variable in the system;

n is the number of encoded variables which are summed together in the linear encoding; and A is the range of variables of $a_1, \ldots, a_n$.

8. An improved method of increasing the tamper-resistance and obscurity of computer software code comprising the steps of:

a) compiling unencoded original computer code into a data-flow-oriented form intermediate code;

b) selecting an encoding technique for a code fragment from said intermediate code;

c) determining a calculable measure of resistance for said encoding techniques;

d) in the event said measure of resistance satisfies a predetermined security requirement;

e) applying said encoding technique to said code fragment to produce an encoded code fragment; and f) repeating steps b) through e) to produce multiple encoded code fragments;

whereby said measure of resistance is an accurate measure of the size of the search space which an attacker must search when attempting to decode the particular encoded code fragment, thereby providing a measure of the workload faced by said attacker to achieve such decoding for improving security; and wherein step c) comprises:

calculating the number of possible candidate code fragments that correspond to said encoding technique for the linear encoding of a product: $R_w$ equal to the product of the numbers of divisors of the integers $x'-b_1$ and $y'-b_2$ where:

$R_w$ is the number of possible candidate code fragments;

$x' = a_1 * x + b_1$; and $y' = a_2 * y + b_2$.

9. An improved method of increasing the tamper-resistance and obscurity of computer software code comprising the steps of:

a) compiling unencoded original computer code into a data-flow-oriented form intermediate code;

b) selecting an encoding technique for a code fragment from said intermediate code;

c) determining a calculable measure of resistance for said encoding techniques;

d) in the event said measure of resistance satisfies a predetermined security requirement;

e) applying said encoding technique to said code fragment to produce an encoded code fragment; and f) repeating steps b) through e) to produce multiple encoded code fragments;

whereby said measure of resistance is an accurate measure of the size of the search space which an attacker must search when attempting to decode the particular encoded code fragment, thereby providing a measure of the workload faced by said attacker to achieve such decoding for improving security; and wherein step c) comprises:

calculating the number of possible candidate code fragments that correspond to said encoding technique for a residue encoding:

$R_w \geq S(p, k)$, where:

$R_w$ is the number of possible candidate code fragments;

$p = p1 \ldots pk$; and

S (x, k) is the number of different representations of integer x as a product of k mutually coprime numbers.

10. An improved method of increasing the tamper-resistance and obscurity of computer software code comprising the steps of:

a) compiling unencoded original computer code into a data-flow-oriented form intermediate code;

b) selecting an encoding technique for a code fragment from said intermediate code;

c) determining a calculable measure of resistance for said encoding techniques;

d) in the event said measure of resistance satisfies a predetermined security requirement;

e) applying said encoding technique to said code fragment to produce an encoded code fragment; and f) repeating steps b) through e) to produce multiple encoded code fragments;

whereby said measure of resistance is an accurate measure of the size of the search space which an attacker must search when attempting to decode the particular encoded code fragment, thereby providing a measure of the workload faced by said attacker to achieve such decoding for improving security; and wherein step c) comprises:

calculating the number of possible candidate code fragments that correspond to said encoding technique for the residue encoding of a sum:

$R_w \geq (n! + 2^{2n} - 1) * p^2$, where:

$R_w$ is the number of possible candidate code fragments;

$p = p_1 \cdot p_2 \cdots p_n$; and n is the number of elements that are being summed together.

11. An improved method of increasing the tamper-resistance and obscurity of computer software code comprising the steps of:
   a) compiling unencoded original computer code into a data-flow-oriented form intermediate code;
   b) selecting an encoding technique for a code fragment from said intermediate code;
   c) determining a calculable measure of resistance for said encoding techniques;
   d) in the event said measure of resistance satisfies a predetermined security requirement;
   e) applying said encoding technique to said code fragment to produce an encoded code fragment; and
   f) repeating steps b) through e) to produce multiple encoded code fragments;

whereby said measure of resistance is an accurate measure of the size of the search space which an attacker must search when attempting to decode the particular encoded code fragment, thereby providing a measure of the workload faced by said attacker to achieve such decoding for improving security; and wherein step c) comprises:

calculating the number of possible candidate code fragments that correspond to said encoding technique for the residue encoding of a product:

$R_w \geq \phi_T;(p)$, where:

$R_w$ is the number of possible candidate code fragments;

$p = p_1 \cdot p_2 \cdots p_n$;

$\phi(N)$ is the Euler function which is the number of positive integers coprime with (positive integer) N and less then N; and $$T = \sum_{i=1}^{t} \alpha_i.$$

12. An improved method of increasing the tamper-resistance and obscurity of computer software code comprising the steps of:
   a) compiling unencoded original computer code into a data-flow-oriented form intermediate code;
   b) selecting an encoding technique for a code fragment from said intermediate code;
   c) determining a calculable measure of resistance for said encoding techniques;
   d) in the event said measure of resistance satisfies a predetermined security requirement;
   e) applying said encoding technique to said code fragment to produce an encoded code fragment; and
   f) repeating steps b) through e) to produce multiple encoded code fragments;

whereby said measure of resistance is an accurate measure of the size of the search space which an attacker must search when attempting to decode the particular encoded code fragment, thereby providing a measure of the workload faced by said attacker to achieve such decoding for improving security; and wherein step c) comprises:

calculating the number of possible candidate code fragments that correspond to said encoding technique for encoding using polynomials of several variables.

$R_w \geq \phi^S; (p)$ where:

$R_w$ is the number of possible candidate code fragments;

$p = p_1 \cdot p_2 \cdots p_n$;

$\phi(N)$ is the Euler function which is the number of positive integers coprime with (positive integer) N and less than N; and $$S = \sum_{i=1}^{N} m_i - N,$$

$m_i$ is the number of independent variables in the ith summand, and N is the number of summands.

* * * * *